US007994678B2

(12) United States Patent
Calley et al.

(10) Patent No.: US 7,994,678 B2
(45) Date of Patent: Aug. 9, 2011

(54) POLYPHASE TRANSVERSE AND/OR COMMUTATED FLUX SYSTEMS

(75) Inventors: David G. Calley, Flagstaff, AZ (US); Thomas F. Janecek, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 0 days.

(21) Appl. No.: 12/948,925

(22) Filed: Nov. 18, 2010

(65) Prior Publication Data

US 2011/0062723 A1    Mar. 17, 2011

Related U.S. Application Data

(62) Division of application No. 12/611,737, filed on Nov. 3, 2009, now Pat. No. 7,868,508.

(60) Provisional application No. 61/110,874, filed on Nov. 3, 2008, provisional application No. 61/110,879, filed on Nov. 3, 2008, provisional application No. 61/110,884, filed on Nov. 3, 2008, provisional application No. 61/110,889, filed on Nov. 3, 2008, provisional application No. 61/114,881, filed on Nov. 14, 2008, provisional application No. 61/168,447, filed on Apr. 10, 2009.

(51) Int. Cl.
*H02K 3/04* (2006.01)

(52) U.S. Cl. .......................... 310/208; 310/201

(58) Field of Classification Search .......... 310/201–203, 310/208, 179–180, 267, 270
See application file for complete search history.

(56) References Cited

U.S. PATENT DOCUMENTS

| | | | |
|---|---|---|---|
| 1,361,136 | A | 12/1920 | Burke |
| 2,078,668 | A | 4/1937 | Kilgore |
| 3,403,273 | A | 9/1968 | Hiroshi |
| 3,437,854 | A | 4/1969 | Oiso |
| 3,558,941 | A | 1/1971 | Visconti Brebbia et al. |
| 3,700,942 | A | 10/1972 | Alth |
| 3,710,158 | A | 1/1973 | Bachle et al. |
| 3,774,059 | A | 11/1973 | Cox |
| 3,869,625 | A | 3/1975 | Sawyer |
| 3,984,711 | A | 10/1976 | Kordik |
| 3,999,107 | A | 12/1976 | Reuting |
| 4,021,691 | A | 5/1977 | Dukshtau et al. |
| 4,114,057 | A | 9/1978 | Esters |

(Continued)

FOREIGN PATENT DOCUMENTS

DE    1513856    4/1969

(Continued)

OTHER PUBLICATIONS

Notice of Allowance dated Mar. 29, 2005 for U.S. Appl. No. 10/721,765.

(Continued)

*Primary Examiner* — Thanh Lam
(74) *Attorney, Agent, or Firm* — Snell & Wilmer L.L.P.

(57) ABSTRACT

Disclosed are single- and poly-phase transverse and/or commutated flux machines and components thereof, and methods of making and using the same. Exemplary devices, including polyphase devices, may variously be configured with an interior rotor and/or an interior stator. Other exemplary devices, including polyphase devices, may be configured in a slim, stacked, and/or nested configuration. Via use of such polyphase configurations, transverse and/or commutated flux machines can achieve improved performance, efficiency, and/or be sized or otherwise configured for various applications.

20 Claims, 19 Drawing Sheets

U.S. PATENT DOCUMENTS

| | | | |
|---|---|---|---|
| 4,127,802 A | 11/1978 | Johnson | |
| 4,206,374 A | 6/1980 | Goddijn | |
| 4,237,396 A | 12/1980 | Blenkinsop et al. | |
| 4,255,684 A | 3/1981 | Mischler et al. | |
| 4,255,696 A | 3/1981 | Field, II | |
| 4,286,180 A | 8/1981 | Langley | |
| 4,306,164 A | 12/1981 | Itoh et al. | |
| 4,363,988 A | 12/1982 | Kliman | |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,605,874 A | 8/1986 | Whiteley | |
| 4,611,139 A | 9/1986 | Godkin et al. | |
| 4,620,752 A | 11/1986 | Fremerey et al. | |
| 4,639,626 A | 1/1987 | McGee | |
| 4,658,166 A | 4/1987 | Oudet | |
| 4,794,286 A | 12/1988 | Taenzer | |
| 4,797,602 A | 1/1989 | West | |
| 4,835,840 A | 6/1989 | Stokes | |
| 4,850,100 A | 7/1989 | Stokes | |
| 4,857,786 A | 8/1989 | Nihei et al. | |
| 4,899,072 A | 2/1990 | Ohta | |
| 4,900,965 A | 2/1990 | Fisher | |
| 4,959,577 A | 9/1990 | Radomski | |
| 5,038,066 A | 8/1991 | Pawlak et al. | |
| 5,051,641 A | 9/1991 | Weh | |
| 5,062,012 A | 10/1991 | Maeda et al. | |
| 5,097,167 A | 3/1992 | Kanayama et al. | |
| 5,117,142 A | 5/1992 | von Zweygbergk | |
| 5,130,595 A | 7/1992 | Arora | |
| 5,132,581 A | 7/1992 | Kusase | |
| 5,177,054 A | 1/1993 | Lloyd | |
| 5,208,503 A | 5/1993 | Hisey | |
| 5,212,419 A | 5/1993 | Fisher et al. | |
| 5,214,333 A | 5/1993 | Kawamura | |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,382,859 A | 1/1995 | Huang et al. | |
| 5,386,166 A | 1/1995 | Reimer et al. | |
| 5,477,841 A | 12/1995 | Trost et al. | |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,696,419 A | 12/1997 | Rakestraw et al. | |
| 5,712,521 A | 1/1998 | Detela | |
| 5,723,921 A | 3/1998 | Sugiura | |
| 5,729,065 A | 3/1998 | Fremery et al. | |
| 5,731,649 A | 3/1998 | Caamano | |
| 5,773,910 A * | 6/1998 | Lange | 310/266 |
| 5,777,418 A | 7/1998 | Lange et al. | |
| 5,780,953 A | 7/1998 | Umeda et al. | |
| 5,814,907 A | 9/1998 | Bandera | |
| 5,886,449 A * | 3/1999 | Mitcham | 310/216.001 |
| 5,889,348 A | 3/1999 | Muhlberger et al. | |
| 5,894,183 A | 4/1999 | Borchert | |
| 5,909,339 A | 6/1999 | Hong | |
| 5,925,965 A | 7/1999 | Li et al. | |
| 5,942,828 A | 8/1999 | Hill | |
| 5,973,436 A | 10/1999 | Mitcham | |
| 5,994,802 A | 11/1999 | Shichijyo et al. | |
| 6,028,377 A | 2/2000 | Sakamoto | |
| 6,043,579 A | 3/2000 | Hill | |
| 6,060,810 A | 5/2000 | Lee et al. | |
| 6,066,906 A | 5/2000 | Kalsi | |
| 6,097,118 A | 8/2000 | Hull | |
| 6,097,126 A | 8/2000 | Takura | |
| 6,121,712 A | 9/2000 | Sakamoto | |
| 6,133,655 A | 10/2000 | Suzuki et al. | |
| 6,133,664 A | 10/2000 | Torok et al. | |
| 6,133,669 A | 10/2000 | Tupper | |
| 6,137,202 A | 10/2000 | Holmes et al. | |
| 6,154,013 A | 11/2000 | Caamano | |
| 6,163,097 A | 12/2000 | Smith et al. | |
| 6,175,177 B1 | 1/2001 | Sabinski et al. | |
| 6,177,748 B1 | 1/2001 | Katcher et al. | |
| 6,181,035 B1 | 1/2001 | Acquaviva | |
| 6,194,799 B1 | 2/2001 | Miekka | |
| 6,229,238 B1 * | 5/2001 | Graef | 310/164 |
| 6,232,693 B1 | 5/2001 | Gierer et al. | |
| 6,236,131 B1 * | 5/2001 | Schafer | 310/163 |
| 6,246,561 B1 | 6/2001 | Flynn | |
| 6,288,467 B1 | 9/2001 | Lange et al. | |
| 6,300,702 B1 | 10/2001 | Jack et al. | |
| 6,304,010 B1 | 10/2001 | Sugiura | |
| 6,342,746 B1 | 1/2002 | Flynn | |
| 6,365,999 B1 | 4/2002 | Muhlberger et al. | |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,472,792 B1 | 10/2002 | Jack et al. | |
| 6,492,758 B1 * | 12/2002 | Gianni et al. | 310/257 |
| 6,545,382 B1 | 4/2003 | Bennett | |
| 6,603,060 B1 | 8/2003 | Ohashi et al. | |
| 6,603,237 B1 | 8/2003 | Caamano | |
| 6,657,329 B2 | 12/2003 | Kastinger et al. | |
| 6,664,704 B2 | 12/2003 | Calley | |
| 6,707,208 B2 | 3/2004 | Durham et al. | |
| 6,717,297 B2 | 4/2004 | Sadarangani et al. | |
| 6,750,582 B1 | 6/2004 | Neet | |
| 6,774,512 B2 | 8/2004 | Takagi et al. | |
| 6,791,225 B2 | 9/2004 | Campbell et al. | |
| 6,794,791 B2 | 9/2004 | Ben Ahmed et al. | |
| 6,815,863 B1 | 11/2004 | Jack et al. | |
| 6,835,941 B1 | 12/2004 | Tanaka | |
| 6,847,135 B2 * | 1/2005 | Kastinger et al. | 310/49.08 |
| 6,849,985 B2 | 2/2005 | Jack et al. | |
| 6,853,112 B2 | 2/2005 | Nakamura et al. | |
| 6,866,111 B2 | 3/2005 | Dube | |
| 6,867,530 B2 | 3/2005 | Gamm et al. | |
| 6,879,080 B2 | 4/2005 | Caamano | |
| 6,882,066 B2 | 4/2005 | Kastinger | |
| 6,882,077 B2 | 4/2005 | Neet | |
| 6,885,124 B2 | 4/2005 | Neet | |
| 6,885,129 B1 | 4/2005 | Oohashi et al. | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,960,862 B2 | 11/2005 | Hill | |
| 6,979,925 B2 | 12/2005 | Schwamm | |
| 6,989,622 B1 | 1/2006 | Chen et al. | |
| 7,015,603 B2 | 3/2006 | Barrho et al. | |
| 7,026,737 B2 | 4/2006 | Angerer et al. | |
| 7,030,529 B2 | 4/2006 | Dommsch et al. | |
| 7,030,534 B2 | 4/2006 | Caamano | |
| 7,064,469 B2 | 6/2006 | Jack et al. | |
| 7,067,954 B2 | 6/2006 | Kuribayashi et al. | |
| 7,071,593 B2 | 7/2006 | Matsushita et al. | |
| 7,126,313 B2 | 10/2006 | Dooley | |
| 7,129,602 B2 | 10/2006 | Lange et al. | |
| 7,135,802 B2 | 11/2006 | Seki et al. | |
| 7,208,856 B2 | 4/2007 | Imai et al. | |
| 7,211,922 B2 | 5/2007 | Isoda et al. | |
| 7,230,361 B2 | 6/2007 | Hirzel | |
| 7,242,118 B2 | 7/2007 | Sakamoto | |
| 7,245,055 B2 | 7/2007 | Jack | |
| 7,250,704 B1 | 7/2007 | Sortore et al. | |
| 7,259,483 B2 | 8/2007 | Komiya et al. | |
| 7,265,472 B2 | 9/2007 | Mitcham | |
| 7,268,456 B2 | 9/2007 | Harada et al. | |
| 7,279,820 B2 | 10/2007 | Grundl et al. | |
| 7,358,639 B2 | 4/2008 | Caamano | |
| 7,385,329 B2 | 6/2008 | Hill | |
| 7,385,330 B2 | 6/2008 | Trzynadlowski et al. | |
| 7,420,312 B2 | 9/2008 | Kitamura et al. | |
| 7,466,057 B2 | 12/2008 | Imai et al. | |
| 7,474,030 B2 | 1/2009 | Mitcham | |
| 7,579,742 B1 | 8/2009 | Rittenhouse | |
| 7,592,735 B2 | 9/2009 | Hamada | |
| 7,602,095 B2 | 10/2009 | Kusase | |
| 7,638,919 B2 * | 12/2009 | Pulnikov et al. | 310/257 |
| 7,679,253 B2 | 3/2010 | Neet | |

| | | |
|---|---|---|
| 7,800,275 B2 | 9/2010 | Calley |
| 7,863,797 B2 | 1/2011 | Calley |
| 7,868,511 B2 | 1/2011 | Calley |
| 7,876,019 B2 | 1/2011 | Calley |
| 2001/0001528 A1 | 5/2001 | Ragaly |
| 2001/0030479 A1 | 10/2001 | Mohler |
| 2001/0030486 A1 | 10/2001 | Pijanowski |
| 2002/0070627 A1 | 6/2002 | Ward et al. |
| 2002/0113520 A1 | 8/2002 | Kastinger et al. |
| 2002/0135242 A1 | 9/2002 | Kawai |
| 2003/0122439 A1 | 7/2003 | Horst |
| 2003/0122440 A1 | 7/2003 | Horst |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0212267 A1 | 10/2004 | Jack et al. |
| 2004/0232799 A1 | 11/2004 | Chen et al. |
| 2004/0239207 A1 | 12/2004 | Kloepzig et al. |
| 2004/0251759 A1 | 12/2004 | Hirzel |
| 2004/0251761 A1 | 12/2004 | Hirzel |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0062348 A1 | 3/2005 | Ohnishi et al. |
| 2005/0121983 A1 | 6/2005 | Ehrhart |
| 2005/0156479 A1 | 7/2005 | Fujita et al. |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0082237 A1 | 4/2006 | Kerlin |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0013253 A1 | 1/2007 | Dubois et al. |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2008/0007126 A1 | 1/2008 | Popov et al. |
| 2008/0169776 A1 | 7/2008 | Acker |
| 2008/0211326 A1 | 9/2008 | Kang et al. |
| 2008/0211336 A1 | 9/2008 | Sadarangani |
| 2008/0246362 A1 | 10/2008 | Hirzel |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0026866 A1 | 1/2009 | Groening et al. |
| 2009/0085415 A1 | 4/2009 | Ionel et al. |
| 2009/0206693 A1 | 8/2009 | Calley et al. |
| 2009/0208771 A1 | 8/2009 | Janecek |
| 2009/0243406 A1 | 10/2009 | Jack et al. |
| 2009/0255924 A1 | 10/2009 | Lovens |
| 2009/0284253 A1 | 11/2009 | Finkler et al. |
| 2009/0295237 A1 | 12/2009 | Gloor |
| 2009/0322165 A1 | 12/2009 | Rittenhouse |
| 2010/0013341 A1 | 1/2010 | Vollmer |
| 2010/0013343 A1 | 1/2010 | Bi |
| 2010/0052467 A1 | 3/2010 | Gieras |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0544200 | 11/1992 |
| EP | 0707374 | 4/1996 |
| EP | 0718959 | 6/1996 |
| EP | 0998010 | 3/2000 |
| EP | 1063754 | 12/2000 |
| EP | 1117168 | 7/2001 |
| EP | 1227566 | 7/2002 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | W02009/027938 | 3/2009 |
| WO | WO 2009116935 | 9/2009 |
| WO | WO 2009116936 | 9/2009 |
| WO | WO 2009116937 | 9/2009 |
| WO | W02009/133295 | 11/2009 |
| WO | W02009/156297 | 12/2009 |
| WO | W02010/036221 | 4/2010 |
| WO | W02010/048928 | 5/2010 |

OTHER PUBLICATIONS

Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
ISR and WO dated Aug. 15, 2008 for International Application No. PCT/US2008/063301.
IPRP dated Nov. 10, 2009 for International Application No. PCT/US2008/063301.
ISR and WO dated Aug. 20, 2008 for International Application No. PCT/US2008/063236.
IPRP dated Nov. 17, 2009 for International Application No. PCT/US2008/063236.
ISR and WO dated Oct. 24, 2008 for International Application No. PCT/US2008/063336.
IPRP dated Nov. 17, 2009 for International Application No. PCT/US2008/063336.
ISR and WO dated Aug. 15, 2008 for International Application No. PCT/US2008/063287.
IPRP dated Nov. 10, 2009 for International Application No. PCT/US2008/063287.
ISR and WO dated Nov. 10, 2009 for International Application No. PCT/US2008/063268.
IPRP dated Nov. 10, 2009 for International Application No. PCT/US2008/063268.
Technical Project Presentation—Development of a High-Performance Generator for Wind Turbines—by Andrzej M. Trzynadlowski, PhD, University of Nevada, Reno, FIEEE, Aug. 2007.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method": J. Elect. Electron. Eng., Australia, vol. 22, No. 1, pp. 69-75, 2002.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University, Jun. 2004.
"Permanent Magnet Assisted Synchronous Reluctance Motor Design and Performance Improvement",—A Dissertation by Peyman Niazi, Texas A&M University, Dec. 2005.

"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.

Dubois, Maxine R. et al.; "Clawpole Transverse-Flux Machine with Hybrid Stator"; pp. 1-6, Jul. 15, 2006.

Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.

Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.

Husband, S.M. et al.; "The Rolls-Royce Transverse Flux Motor Development"; Electric Machines and Drives Conference, vol. 3, pp. 1435-1440, IEEE, 2003.

Theory of SR Motor Operation (Power Point Presentation), copyright 2002 by George Holling and Rocky Mountain Technologies Inc.

Fundamental Modeling for Optimal Design of Transverse Flux Motors—Genevieve Patterson et al., University of Tokyo, 2008.

www.higenmotor.com/eng/aboutus/about06 read.asp?id=notice &no=87 dated Jan. 15, 2010.

Lyng Eltorque QT 800—2.0 User Manual, version 1.0—dated Jul. 3, 2007.

Motors: Emerging Concepts (Apr. 2007) by George Holling.

Raser Technologies Company Brochure, 2005.

Response to Office Action filed Jan. 15, 2010 for Japanese Patent Application No. JP-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

Restriction Requirement dated Dec. 20, 2010 for U.S. Appl. No. 12/149,933.

Final Office Action dated Jan. 4, 2011 for U.S. Appl. No. 12/149,936.

Restriction Requirement dated Feb. 24, 2011 for U.S. Appl. No. 12/942,495.

Notice of Allowance dated Feb. 28, 2011 for U.S. Appl. No. 12/149,936.

"Two Dimensional Finite Analysis of Passive Rotor Transverse Flux Motors with Slanted Rotor Design" by B.E. Hasubek, et al., May 1999.

Notice of Allowance dated Nov. 2, 2010 for U.S. Appl. No. 12/847,991.

Notice of Allowance dated Dec. 9, 2010 for U.S. Appl. No. 12/611,733.

Notice of Allowance dated Apr. 19, 2011 for U.S. Appl. No. 12/942,495.

ISR & WO dated Apr. 12, 2011 for International Application No. PCT/US2010/033445.

ISR & WO dated Apr. 12, 2011 for International Application No. PCT/US2010/033444.

ISR & WO dated Apr. 12, 2011 for International Application No. PCT/US2010/033446.

* cited by examiner

RADIAL GAP

AXIAL GAP

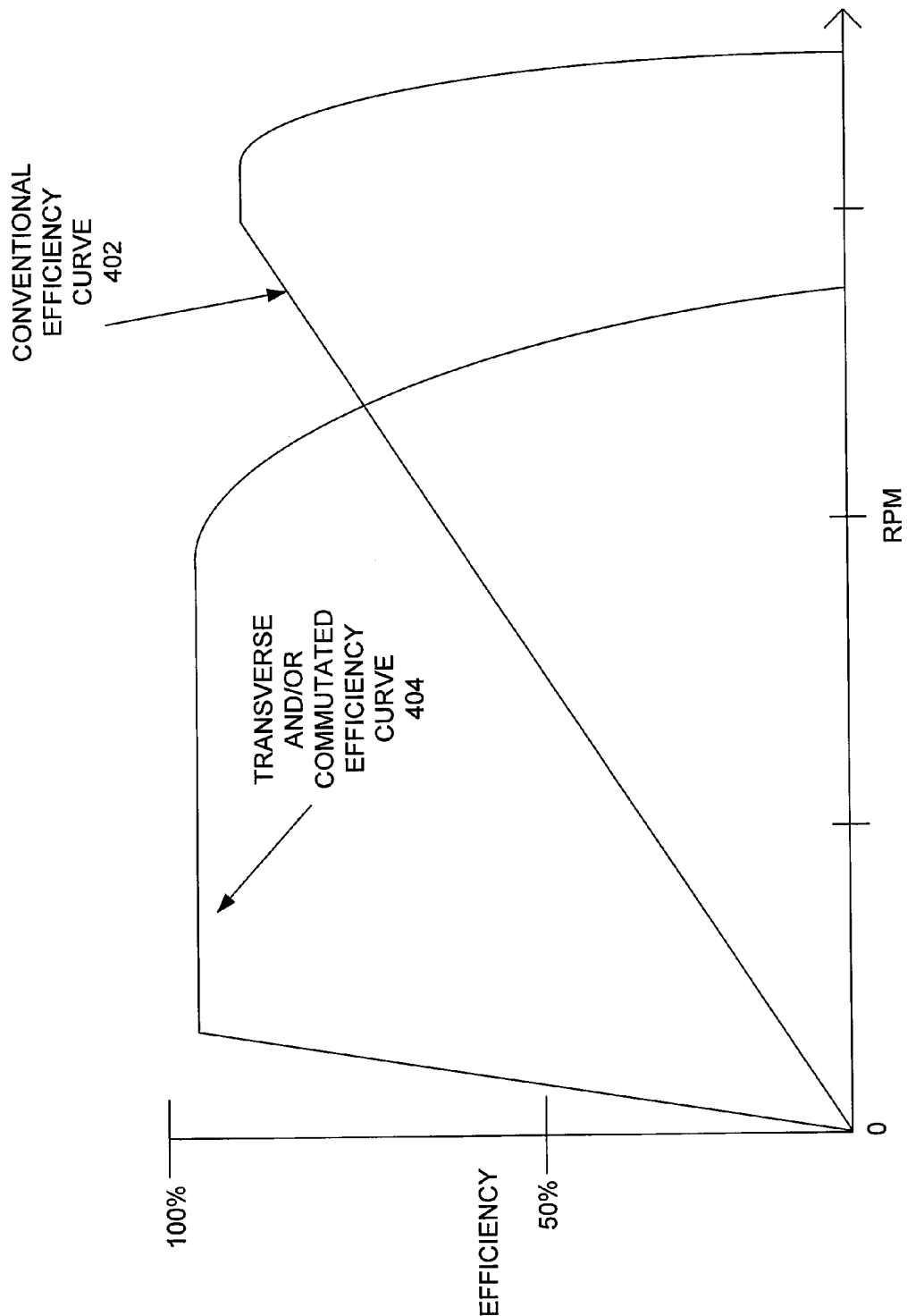

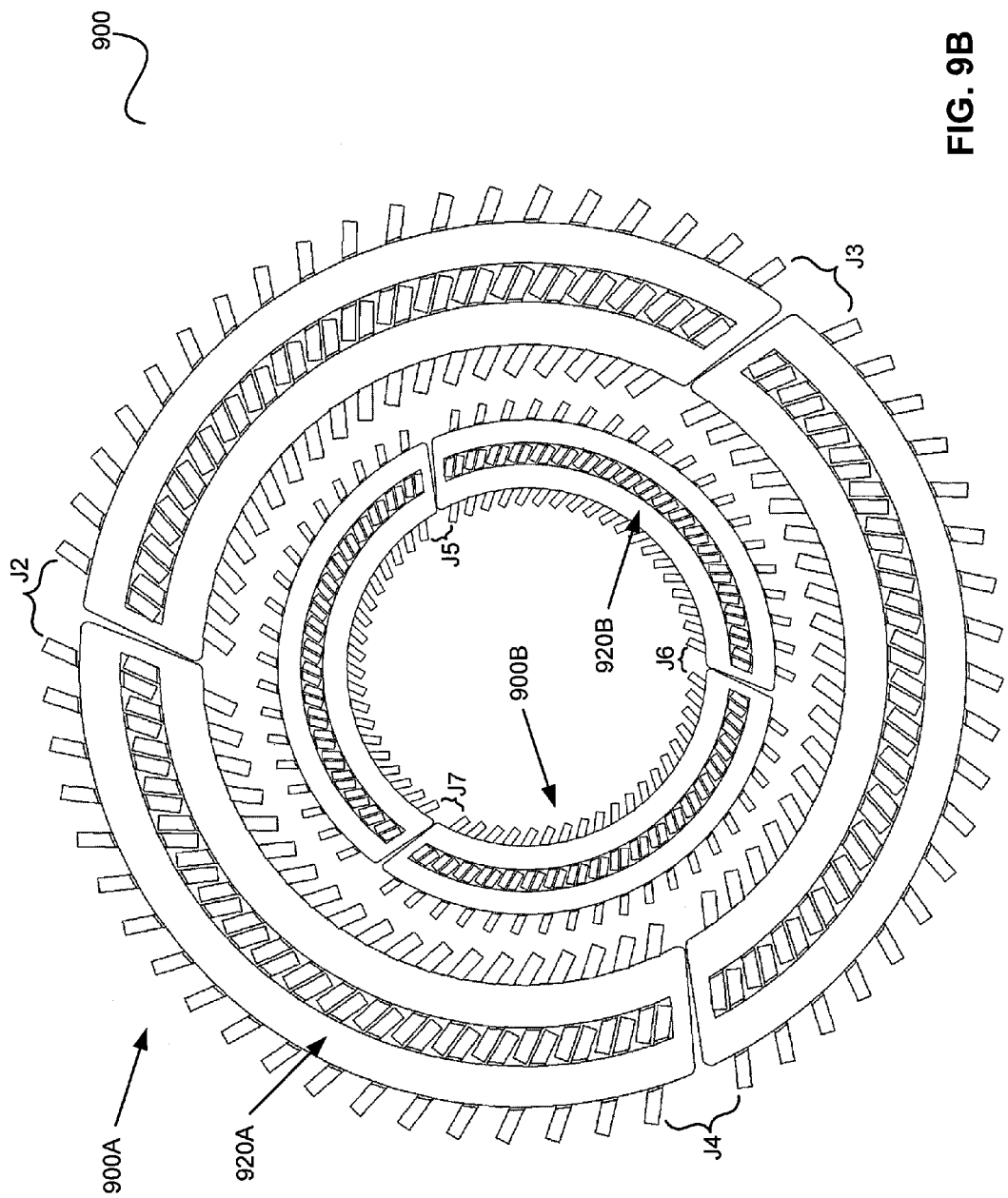

POLYPHASE TRANSVERSE AND/OR COMMUTATED FLUX SYSTEMS

CROSS REFERENCE TO RELATED APPLICATIONS

This application is a divisional of U.S. Ser. No. 12/611,737 filed on Nov. 3, 2009 and entitled "POLYPHASE TRANSVERSE AND/OR COMMUTATED FLUX SYSTEMS".

U.S. Ser. No. 12/611,737 is a non-provisional of U.S. Provisional No. 61/110,874 filed on Nov. 3, 2008 and entitled "ELECTRICAL OUTPUT GENERATING AND DRIVEN ELECTRICAL DEVICES USING COMMUTATED FLUX AND METHODS OF MAKING AND USE THEREOF INCLUDING DEVICES WITH TRUNCATED STATOR PORTIONS."

U.S. Ser. No. 12/611,737 is also a non-provisional of U.S. Provisional No. 61/110,879 filed on Nov. 3, 2008 and entitled "ELECTRICAL OUTPUT GENERATING AND DRIVEN ELECTRICAL DEVICES USING COMMUTATED FLUX AND METHODS OF MAKING AND USE THEREOF."

U.S. Ser. No. 12/611,737 is also a non-provisional of U.S. Provisional No. 61/110,884 filed on Nov. 3, 2008 and entitled "METHODS OF MACHINING AND USING AMORPHOUS METALS OR OTHER MAGNETICALLY CONDUCTIVE MATERIALS INCLUDING TAPE WOUND TORROID MATERIAL FOR VARIOUS ELECTROMAGNETIC APPLICATIONS."

U.S. Ser. No. 12/611,737 is also a non-provisional of U.S. Provisional No. 61/110,889 filed on Nov. 3, 2008 and entitled "MULTI-PHASE ELECTRICAL OUTPUT GENERATING AND DRIVEN ELECTRICAL DEVICES WITH TAPE WOUND CORE LAMINATE ROTOR OR STATOR ELEMENTS, AND METHODS OF MAKING AND USE THEREOF."

U.S. Ser. No. 12/611,737 is also a non-provisional of U.S. Provisional No. 61/114,881 filed on Nov. 14, 2008 and entitled "ELECTRICAL OUTPUT GENERATING AND DRIVEN ELECTRICAL DEVICES USING COMMUTATED FLUX AND METHODS OF MAKING AND USE THEREOF."

U.S. Ser. No. 12/611,737 is also a non-provisional of U.S. Provisional No. 61/168,447 filed on Apr. 10, 2009 and entitled "MULTI-PHASE ELECTRICAL OUTPUT GENERATING AND DRIVEN ELECTRICAL DEVICES, AND METHODS OF MAKING AND USING THE SAME." The entire contents of all of the foregoing applications are hereby incorporated by reference.

TECHNICAL FIELD

The present disclosure relates to electrical systems, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. In particular, improved transverse flux machines and/or commutated flux machines are desirable. Moreover, transverse flux machines and/or commutated flux machines configured to accommodate multi-phase input and/or produce multi-phase output are desirable.

SUMMARY

This disclosure relates to transverse and/or commutated flux machines. In an exemplary embodiment, an electrical machine comprises a rotor having an inner side and an outer side with respect to a rotational axis of the electrical machine, and a conductive coil comprising a first coil portion, a second coil portion, a first coil end, and a second coil end. The first coil portion and the second coil portion are connected via the first coil end and the second coil end to form a loop. The conductive coil extends along only a portion of the circumference of the rotor. The electrical machine further comprises a first set of flux conductors at least partially enclosing the first coil portion, and a second set of flux conductors at least partially enclosing the second coil portion. The electrical machine is at least one of a transverse flux machine or a commutated flux machine.

In another exemplary embodiment, a method for generating electricity comprises providing an electrical machine comprising a conductive coil comprising a first coil portion, a second coil portion, a first coil end, and a second coil end, wherein the first coil portion and the second coil portion are connected via the first coil end and the second coil end to form a loop. The conductive coil extends less than 360 degrees around the rotational axis of an electrical machine. The method for generating electricity further comprises at least partially enclosing the first coil portion with a first set of flux conductors, at least partially enclosing the second coil portion with a second set of flux conductors, engaging a rotor with the first set of flux conductors and the second set of flux conductors, and rotating the rotor to induce a voltage in the conductive coil. The electrical machine is at least one of a transverse flux machine or a commutated flux machine.

In another exemplary embodiment, a method for generating electricity comprises coupling an electrical machine to a load. The electrical machine comprises a rotor and a conductive coil. The electrical machine is at least one of a transverse flux machine or a commutated flux machine. The method for generating electricity further comprises rotating the rotor to induce a voltage in the conductive coil. The conductive coil comprises a first coil portion, a second coil portion, a first coil end, and a second coil end. The first coil portion and the second coil portion are connected via the first coil end and the second coil end to form a loop. The conductive coil extends less than 360 degrees around the rotational axis of the electrical machine.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 4 illustrates electric motor efficiency curves in accordance with an exemplary embodiment;

FIG. 9B illustrates a polyphase device of FIGS. 8A-8C having a similar polyphase device nested within in a phase-staggered manner in accordance with an exemplary embodiment.

DETAILED DESCRIPTION

Figure 1B:
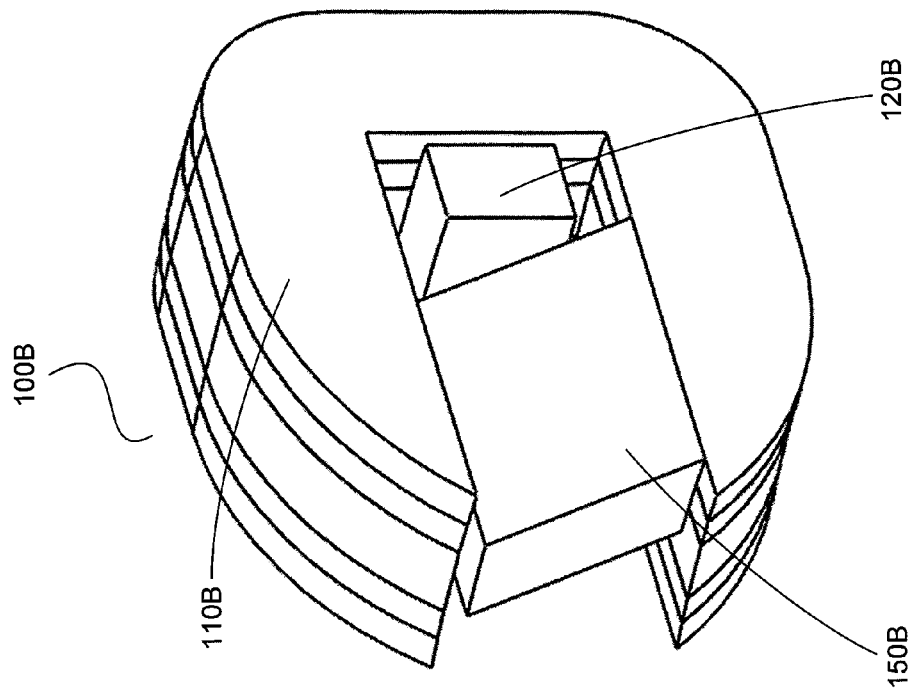
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example conventional DC brushless motors, suffer from various deficiencies. For example, many electric motors are inefficient at various rotational speeds and/or loads, for example low rotational speeds. Thus, the motor is typically operated within a narrow RPM range and/or load range of suitable efficiency. In these configurations, gears or other mechanical approaches may be required in order to obtain useful work from the motor.

Moreover, many electric motors have a low pole count. Because power is a function of torque and RPM, such motors must often be operated at a high physical RPM in order to achieve a desired power density and/or electrical frequency. Moreover, a higher power density (for example, a higher kilowatt output per kilogram of active electrical and magnetic motor mass) optionally is achieved by operating the motor at high rotational speed and therefore high electrical frequency. However, high electrical frequency can result in high core losses and hence lower efficiency. Moreover, high electrical frequency can result in increased cost, increased mechanical complexity, and/or decreased reliability. Additionally, high electrical frequency and associated losses create heat that may require active cooling, and can limit the operational range of the motor. Heat can also degrade the life and reliability of a high frequency machine.

Still other electric motors contain large volumes of copper wire or other coil material. Due to the length of the coil windings, resistive effects in the coil lead to coil losses. For example, such losses convert a portion of electrical energy into heat, reducing efficiency and potentially leading to thermal damage to and/or functional destruction of the motor.

Moreover, many prior electric motors offered low torque densities. As used herein, "torque density" refers to Newton-meters produced per kilogram of active electrical and magnetic materials. For example, many prior electric motors are configured with a torque density from about 0.5 Newton-meters per kilogram to about 3 Newton-meters per kilogram. Thus, a certain electric motor with a torque density of 1 Newton-meter per kilogram providing, for example, 10 total Newton-meters of torque may be quite heavy, for example in excess of 10 kilograms of active electrical and magnetic materials. Similarly, another electric motor with a torque density of 2 Newton-meters per kilogram providing, for example, 100 total Newton-meters of torque may also be quite heavy, for example in excess of 50 kilograms of active electrical and magnetic materials. As can be appreciated, the total weight of these electric motors, for example including weight of frame components, housings, and the like, may be significantly higher. Moreover, such prior electric motors are often quite bulky as a result of the large motor mass. Often, a motor of sufficient torque and/or power for a particular application is difficult or even impossible to fit in the available area.

Even prior transverse flux machines have been unable to overcome these difficulties. For example, prior transverse flux machines have suffered from significant flux leakage. Still others have offered torque densities of only a few Newton-meters per kilogram of active electrical and magnetic materials. Moreover, various prior transverse flux machines have been efficiently operable only within a comparatively narrow RPM and/or load range. Additionally, using prior transverse flux machines to generate substantial output power often required spinning relatively massive and complicated components (i.e., those involving permanent magnets and/or relatively exotic, dense and/or expensive flux concentrating or conducting materials) at high rates of speed. Such high-speed operation requires additional expensive and/or complicated components for support and/or system reliability. Moreover, many prior transverse flux machines are comparatively expensive and/or difficult to manufacture, limiting their viability.

In contrast, various of these problems can be solved by utilizing transverse flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor. Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 2B:
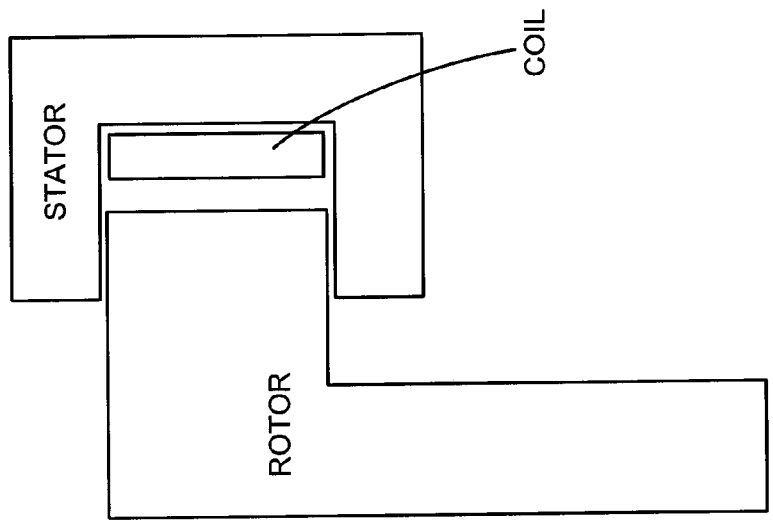
FIG. 2B illustrates an exemplary radial gap configuration in accordance with an exemplary embodiment.
Figure 2A:
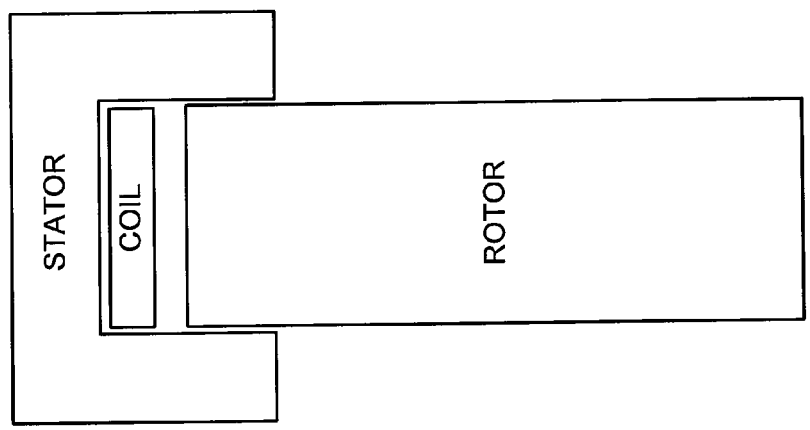
FIG. 2A illustrates an exemplary axial gap configuration in accordance with an exemplary embodiment.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3B:
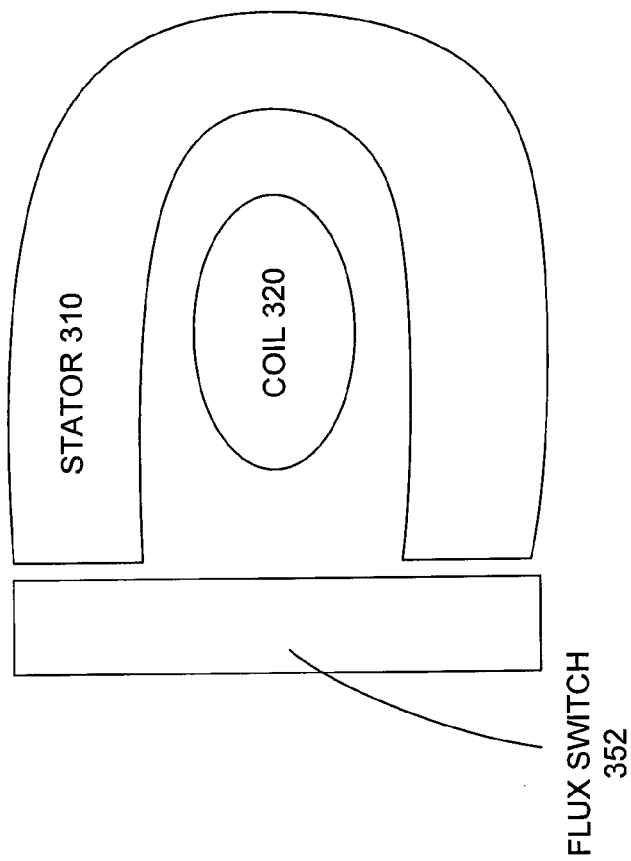
FIG. 3B illustrates an exemplary face engaged configuration in accordance with an exemplary embodiment.
Figure 3A:
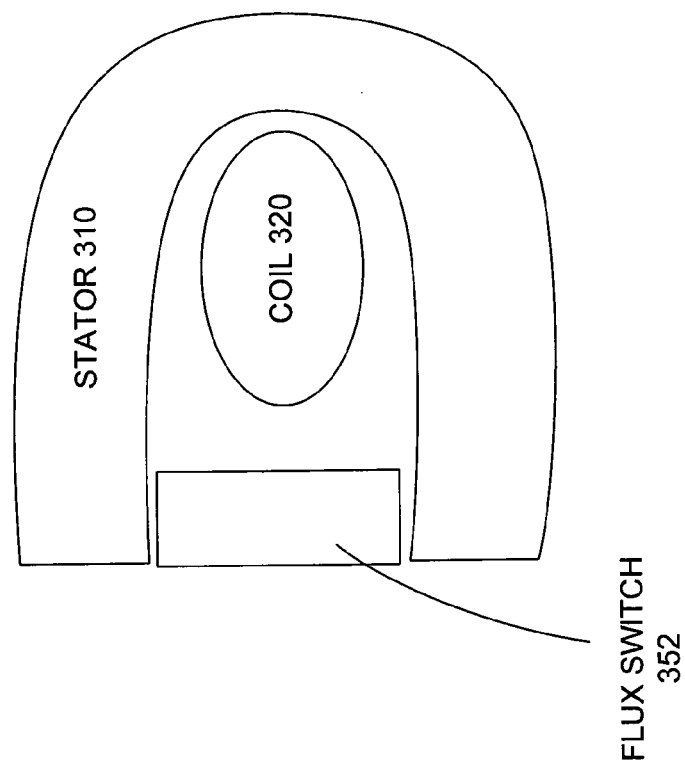
FIG. 3A illustrates an exemplary cavity engaged configuration in accordance with an exemplary embodiment.
Figure 3C:
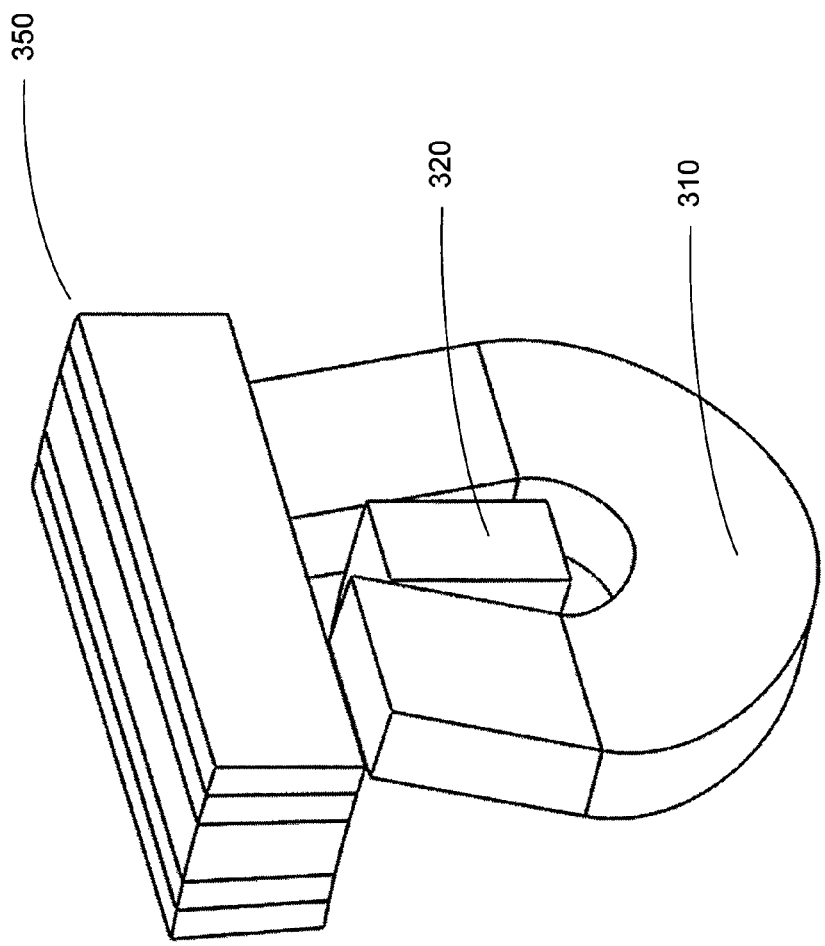
FIG. 3C illustrates an exemplary face engaged transverse flux configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner.

Figure 1A:
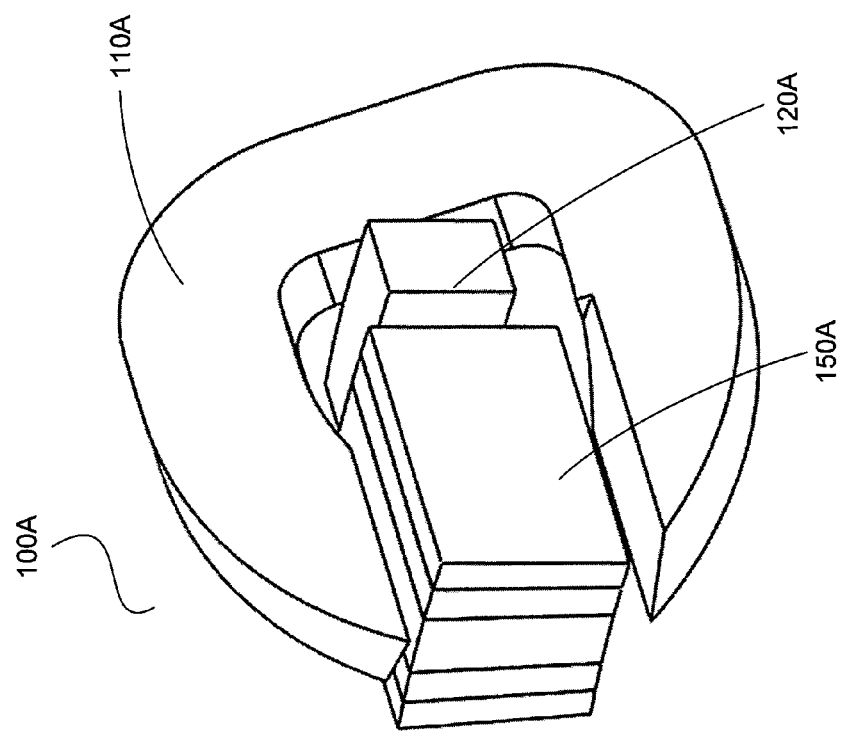
FIG. 1A illustrates an exemplary transverse flux machine in accordance with an exemplary embodiment.

In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit. (i.e., a portion where the permeability is significantly higher than air). A magnet may be located on the stator or the rotor. A coil is at least partially enclosed by the stator or the rotor. Optionally, flux concentrating portions may be included on the stator and/or the rotor. With momentary reference now to FIG. 1A, an exemplary transverse flux machine 100A may comprise a rotor 150A, a stator 110A, and a coil 120A. In this exemplary embodiment, a magnet may be located on rotor 150A. With momentary reference now to FIG. 1B, an exemplary commutated flux machine 100B may comprise a rotor 150B, a stator 110B, and a coil 120B. In this exemplary embodiment, a magnet may be located on stator 110B.

Moreover, a transverse flux machine and/or commutated flux machine may be configured with any suitable components, structures, and/or elements in order to provide desired electrical, magnetic, and/or physical properties. For example, a commutated flux machine having a continuous, thermally stable torque density in excess of 50 Newton-meters per kilogram may be achieved by utilizing a polyphase configuration. As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without thermal performance degradation and/or damage.

Moreover, a transverse flux machine and/or commutated flux machine may be configured to achieve low core losses. By utilizing materials having high magnetic permeability, low coercivity, low hysteresis losses, low eddy current losses, and/or high electrical resistance, core losses may be reduced. For example, silicon steel, powdered metals, plated powdered metals, soft magnetic composites, amorphous metals, nanocrystalline composites, and/or the like may be utilized in rotors, stators, switches, and/or other flux conducting components of a transverse flux machine and/or commutated flux machine. Eddy currents, flux leakage, and other undesirable properties may thus be reduced.

A transverse flux machine and/or commutated flux machine may also be configured to achieve low core losses by varying the level of saturation in a flux conductor, such as in an alternating manner. For example, a flux conducting element in a stator may be configured such that a first portion of the flux conducting element saturates at a first time during operation of the stator. Similarly, a second portion of the same flux conducting element saturates at a second time during operation of the stator. In this manner, portions of the flux conducting element have a level of magnetic flux density significantly below the saturation induction from time to time, reducing core loss. For example, significant portions of the flux conducting element may have a level of flux density less than 25% of the saturation induction within the 50% of the time of its magnetic cycle. Moreover, any suitable flux density variations may be utilized.

Furthermore, a transverse flux machine and/or commutated flux machine may be configured to achieve low coil losses. For example, in contrast to a conventional electric motor utilizing a mass of copper C in one or more coils in order to achieve a desired output power P, a particular transverse flux machine and/or commutated flux machine may utilize only a small amount of copper C (for example, one-tenth as much copper C) while achieving the same output power P. Additionally, a transverse flux machine and/or commutated flux machine may be configured to utilize coil material in an improved manner (for example, by reducing and/or eliminating "end turns" in the coil). In this manner, resistive losses, eddy current losses, thermal losses, and/or other coil losses associated with a given coil mass C may be reduced. Moreover, within a transverse flux machine and/or commutated flux machine, a coil may be configured, shaped, oriented, aligned, manufactured, and/or otherwise configured to further reduce losses for a given coil mass C.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil mass and/or the number of turns in the coil may thus be achieved.

Yet further, in accordance with principles of the present disclosure, a transverse flux machine and/or commutated flux machine may be configured to achieve a high flux switching frequency, for example a flux switching frequency in excess of 1000 Hz. Because flux is switched at a high frequency, torque density may be increased.

With reference now to FIG. 4, a typical conventional electric motor efficiency curve 402 for a particular torque is illustrated. Revolutions per minute (RPM) is illustrated on the X axis, and motor efficiency is illustrated on the Y axis. As illustrated, a conventional electric motor typically operates at a comparatively low efficiency at low RPM. For this conventional motor, efficiency increases and then peaks at a particular RPM, and eventually falls off as RPM increases further. As a result, many conventional electric motors are often desirably operated within an RPM range near peak efficiency. For example, one particular prior art electric motor may have a maximum efficiency of about 90% at about 3000 RPM, but the efficiency falls off dramatically at RPMs that are not much higher or lower.

Gearboxes, transmissions, and other mechanical mechanisms are often coupled to an electric motor to achieve a desired output RPM or other output condition. However, such mechanical components are often costly, bulky, heavy, and/or impose additional energy losses, for example frictional losses. Such mechanical components can reduce the overall efficiency of the motor/transmission system. For example, an electric motor operating at about 90% efficiency coupled to a gearbox operating at about 70% efficiency results in a motor/gearbox system having an overall efficiency of about 63%. Moreover, a gearbox may be larger and/or weigh more or cost more than the conventional electric motor itself. Gearboxes also reduce the overall reliability of the system.

In contrast, with continuing reference to FIG. 4 and in accordance with principles of the present disclosure, a transverse and/or commutated flux machine efficiency curve 404 for a particular torque is illustrated. In accordance with principles of the present disclosure, a transverse and/or commutated flux machine may rapidly reach a desirable efficiency level (for example, 80% efficiency or higher) at an RPM lower than that of a conventional electric motor. Moreover, the transverse and/or commutated flux machine may maintain a desirable efficiency level across a larger RPM range than that of a conventional electric motor. Additionally, the efficiency of the transverse and/or commutated flux machine may fall off more slowly past peak efficiency RPM as compared to a conventional electric motor.

Furthermore, in accordance with principles of the present disclosure, a transverse and/or commutated flux machine may achieve a torque density higher than that of a conventional electric motor. For example, in an exemplary embodiment a transverse and/or commutated flux machine may achieve a continuous, thermally stable torque density in excess of 100 Newton-meters per kilogram.

Thus, in accordance with principles of the present disclosure, a transverse and/or commutated flux machine may desirably be employed in various applications. For example, in an automotive application, a transverse and/or commutated flux machine may be utilized as a wheel hub motor, as a direct driveline motor, and/or the like. Moreover, in an exemplary embodiment having a sufficiently wide operational RPM range, particularly at lower RPMs, a transverse and/or commutated flux machine may be utilized in an automotive application without need for a transmission, gearbox, and/or similar mechanical components.

An exemplary electric or hybrid vehicle embodiment comprises a transverse flux motor for driving a wheel of the vehicle, wherein the vehicle does not comprise a transmission, gearbox, and/or similar mechanical component(s). In this exemplary embodiment, the electric or hybrid vehicle is significantly lighter than a similar vehicle that comprises a transmission-like mechanical component. The reduced weight may facilitate an extended driving range as compared to a similar vehicle with a transmission like mechanical component. Alternatively, weight saved by elimination of the gearbox allows for utilization of additional batteries for extended range. Moreover, weight saved by elimination of the gearbox allows for additional structural material for improved occupant safety. In general, a commutated flux machine having a broad RPM range of suitable efficiency may desirably be utilized in a variety of applications where a direct-drive configuration is advantageous. For example, a commutated flux machine having an efficiency greater than 80% over an RPM range from only a few RPMs to about 2000 RPMs may be desirably employed in an automobile.

Moreover, the exemplary transmissionless electric or hybrid vehicle may have a higher overall efficiency. Stated otherwise, the exemplary vehicle may more efficiently utilize the power available in the batteries due to the improved efficiency resulting from the absence of a transmission-like component between the motor and the wheel of the vehicle. This, too, is configured to extend driving range and/or reduce the need for batteries.

Additionally, the commutated flux machine is configured to have a high torque density. In accordance with principles of the present disclosure, the high torque density commutated flux machine is also well suited for use in various applications, for example automotive applications. For example, a conventional electric motor may have a torque density of between about 0.5 to about 3 Newton-meters per kilogram. Additional techniques, for example active cooling, can enable a conventional electric motor to achieve a torque density of up to about 50 Newton-meters per kilogram. However, such techniques typically add significant additional system mass, complexity, bulk, and/or cost. Additionally, such conventional electric motors configured to produce comparatively high amounts of torque, for example the Siemens 1FW6 motor, are limited to comparatively low RPM operation, for example operation below 250 RPMs.

In contrast, in accordance with principles of the present disclosure, an exemplary passively cooled transverse flux machine and/or commutated flux machine may be configured with a continuous, thermally stable torque density in excess of 50 Newton-meters per kilogram. As used herein, "passively cooled" is generally understood to refer to systems without cooling components requiring power for operation, for example water pumps, oil pumps, cooling fans, and/or the like. Moreover, this exemplary transverse flux machine and/or commutated flux machine may be configured with a compact diameter, for example a diameter less than 14 inches. Another exemplary transverse flux machine and/or commutated flux machine may be configured with a continuous, thermally stable torque density in excess of 100 Newton-meters per kilogram and a diameter less than 20 inches. Accordingly, by utilizing various principles of the present disclosure, exemplary transverse flux machines and/or commutated flux machines may be sized and/or otherwise configured and/or shaped in a manner suitable for mounting as a wheel hub motor in an electric vehicle, because the transverse flux machine and/or commutated flux machine is significantly lighter and/or more compact than a conventional electric motor. In this manner, the unsprung weight of the resulting wheel/motor assembly can be reduced. This can improve vehicle handling and reduce the complexity and/or size of suspension components.

Further, in accordance with principles of the present disclosure, a transverse flux machine and/or commutated flux machine may desirably be utilized in an electromechanical system having a rotating portion, for example a washing machine or other appliance. In one example, a conventional washing machine typically utilizes an electric motor coupled to a belt drive to spin the washer drum. In contrast, a transverse flux machine and/or commutated flux machine may be axially coupled to the washer drum, providing a direct drive configuration and eliminating the belt drive element. Alternatively, a transverse flux machine and/or commutated flux machine, for example one comprising a partial stator, may be coupled to a rotor. The rotor may have a common axis as the washer drum. The rotor may also be coupled directly to the washer drum and/or integrally formed therefrom. In this manner, a transverse flux machine and/or commutated flux machine may provide rotational force for a washing machine or other similar electromechanical structures and/or systems.

Moreover, in accordance with principles of the present disclosure, a transverse flux machine and/or commutated flux machine may desirably be utilized to provide mechanical output to relatively lightweight vehicles such as bicycles, scooters, motorcycles, quads, golf carts, or other vehicles. Additionally, a transverse flux machine and/or commutated flux machine may desirably be utilized in small engine applications, for example portable generators, power tools, and other electrical equipment. A transverse flux machine and/or commutated flux machine may desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. In general, transverse flux machines and/or commutated flux machines may be utilized to provide electrical and/or mechanical input and/or output to and/or from any suitable devices.

In accordance with various exemplary embodiments, exemplary transverse flux and/or commutated flux machines are configured to accommodate polyphase input and/or produce polyphase output. Polyphase input and/or output devices can have various advantages compared to single-phase devices. For example, polyphase motors may not require external circuitry or other components in order to produce an initialing torque. Polyphase devices can also avoid pulsating and/or intermittency, for example pulsating and/or intermittency caused when current produced by a single phase device passes through the part of its cycle in which the current has zero amplitude. Instead, polyphase devices can deliver substantially constant power output over each period of an alternating current input, and vice versa.

Polyphase devices can be produced using layouts similar to single phase layouts disclosed in various co-pending applications incorporated by reference herein. Polyphase devices can also be produced using layouts having single rotor/stator sets, or layouts having polyphase features that differ from single phase rotor/stator layouts. Moreover, polyphase devices can be produced in any suitable configurations, as desired.

Although exemplary embodiments shown herein generally have magnets on a rotor portion and flux switches on a stator portion, it should be noted that other variations may be made in accordance with aspects of the present disclosure. For example, flux switches may be mounted onto a rotor portion, and a series of magnets may be mounted onto a stator portion. Alternatively, flux switches can be mounted onto a rotor portion and an electromagnet can be mounted onto a stator portion. Numerous other relationships between a stator portion and a rotor portion are also possible. For example, either a stator portion or a rotor portion may be mounted as an exterior-most component. Moreover, magnets, flux concentrators, and/or flux switches may be arranged, configured, and/or coupled in order to conduct magnetic flux in such a way as to either generate electrical output or to drive the rotor. In addition, flux switches, flux concentrators, coils, and/or magnets can be mounted to either of a rotor portion or a stator portion.

In general, certain exemplary polyphase devices may be constructed by combining, linking, and/or otherwise utilizing and/or including suitable elements of single-phase devices. In an exemplary embodiment and with reference now to FIG. 5A, a single phase device 500A comprises rotor 550, a stator 510, and a coil 520. Single phase device 500A is illustrated here in cross section showing a transverse flux machine. In this exemplary embodiment, rotor 550 is cavity engaged with stator 510 in an axial gap configuration. Stator 510 partially surrounds coil 520.

In an exemplary embodiment, stator 510 is held stationary and rotor 550 rotates about an axis of rotation 551. It will be readily appreciated that in various other exemplary configurations, rotor 550 may be held stationary, so as to act as a stator. In these embodiments, stator 510 may be moved, so as to act as a rotor.

In various embodiments, rotor 550 comprises a stack of alternating magnet and flux concentrating portions.

Figure 5A:
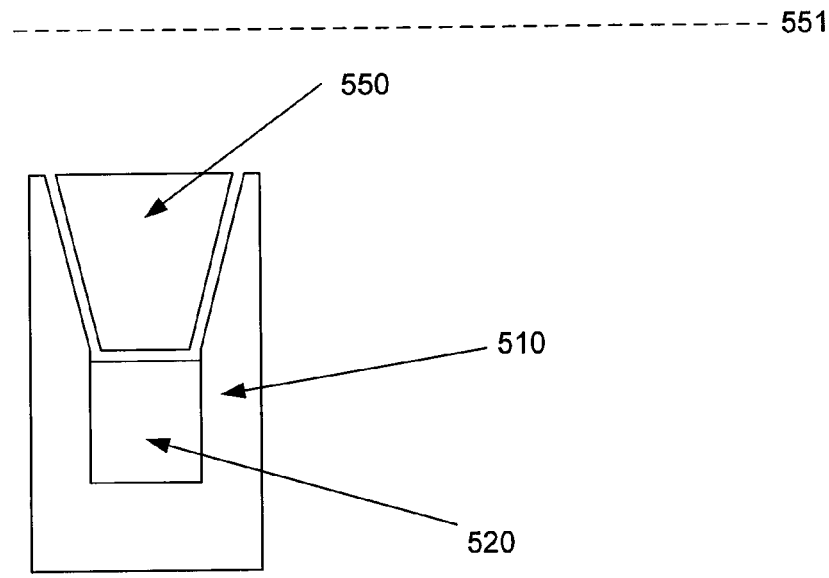
FIG. 5A illustrates a cross-section of an exemplary single-phase stator/rotor assembly in accordance with an exemplary embodiment.
Figure 5B:
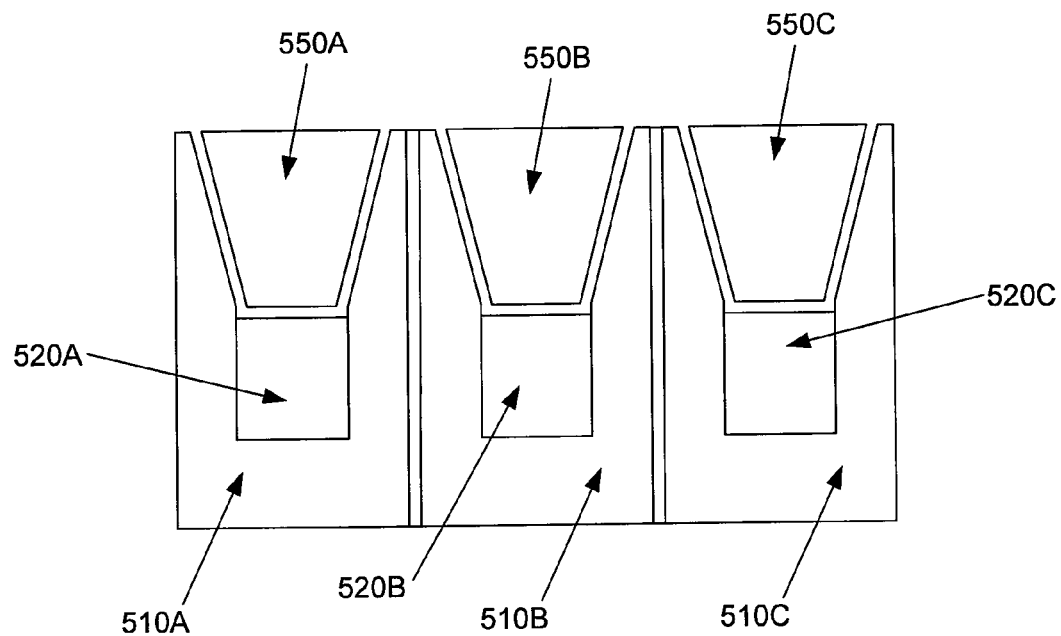
FIG. 5B illustrates a cross-section of an exemplary three-phase configuration based on the single-phase configuration of FIG. 5A in accordance with an exemplary embodiment.

With reference now to FIG. 5B, in various exemplary embodiments a polyphase design may be constructed by duplicating one or more portions of a single-phase design. In an exemplary embodiment, polyphase device 500B comprises three rotor portions 550A, 550B, and 500C placed concentrically around a common axis of rotation In various exemplary embodiments, polyphase device 500B comprises any suitable number of rotors and/or stators, for example two rotors, four rotors, five rotors, and so on. Moreover, rotor portions 550A, 550B, and 550C can be capable of independent rotation. Alternatively, rotors portions 550A, 550B, and 550C can be coupled to one another, such that rotor portions 550A, 550B, and 550C rotate together.

In certain exemplary embodiments, rotor portions 550A, 550B, and 550C are very similar in design or even identical, as illustrated in FIG. 5B. In other exemplary embodiments, one or more of rotor portions 550A, 550B, and 550C may be smaller than others. In yet other exemplary embodiments, rotor portions 550A, 550B, and 550C differ from one another.

In various exemplary embodiments, a rotor portion 550 (e.g., one or more of 550A, 550B, or 550C) has a cross sectional shape. For example, a rotor portion 550 may have a wedge shape. Alternatively, the rotor portions 550 may comprise various other suitable shapes, for example an arrowhead shape, a circular cross sectional shape, a rectangular cross-sectional shape, and/or the like.

In various embodiments, rotor portions 550A, 550B, and 550C, when assembled into an electrically driven device and/or electrical output device, each comprise a stack of alternating magnet and flux concentrating portions.

In various exemplary embodiments, each rotor portion 550A, 550B, 550C of polyphase device 500B corresponds to a coil 520a, 520B, and 520C, respectively. Coils 520A, 520B, and 520C are typically oriented circumferentially about the center of polyphase device 500B. Generally, coils 520A, 520B, and 520C are fixed to the corresponding stator portion and thus do not rotate with rotor portions 550A, 550B, and 550C. In addition, stator portions 510A, 510B and 510C corresponding to each rotor are occupy at least a portion of the space between coils 520A, 520B, and 520C. In an exemplary embodiment, rotor portions 550A, 550B, and 550C rotate independently of stator portions 510A, 510B and 510C, which generally remain fixed.

Alternatively, rotor portions 550A, 550B, 550C can remain fixed so as to be the stator portion. In these embodiments, coils 520A, 520B, and 520C as well as stator portions 510A, 510B and 510C are rotated with respect to the rotor portions.

Figures 5C, 5D:
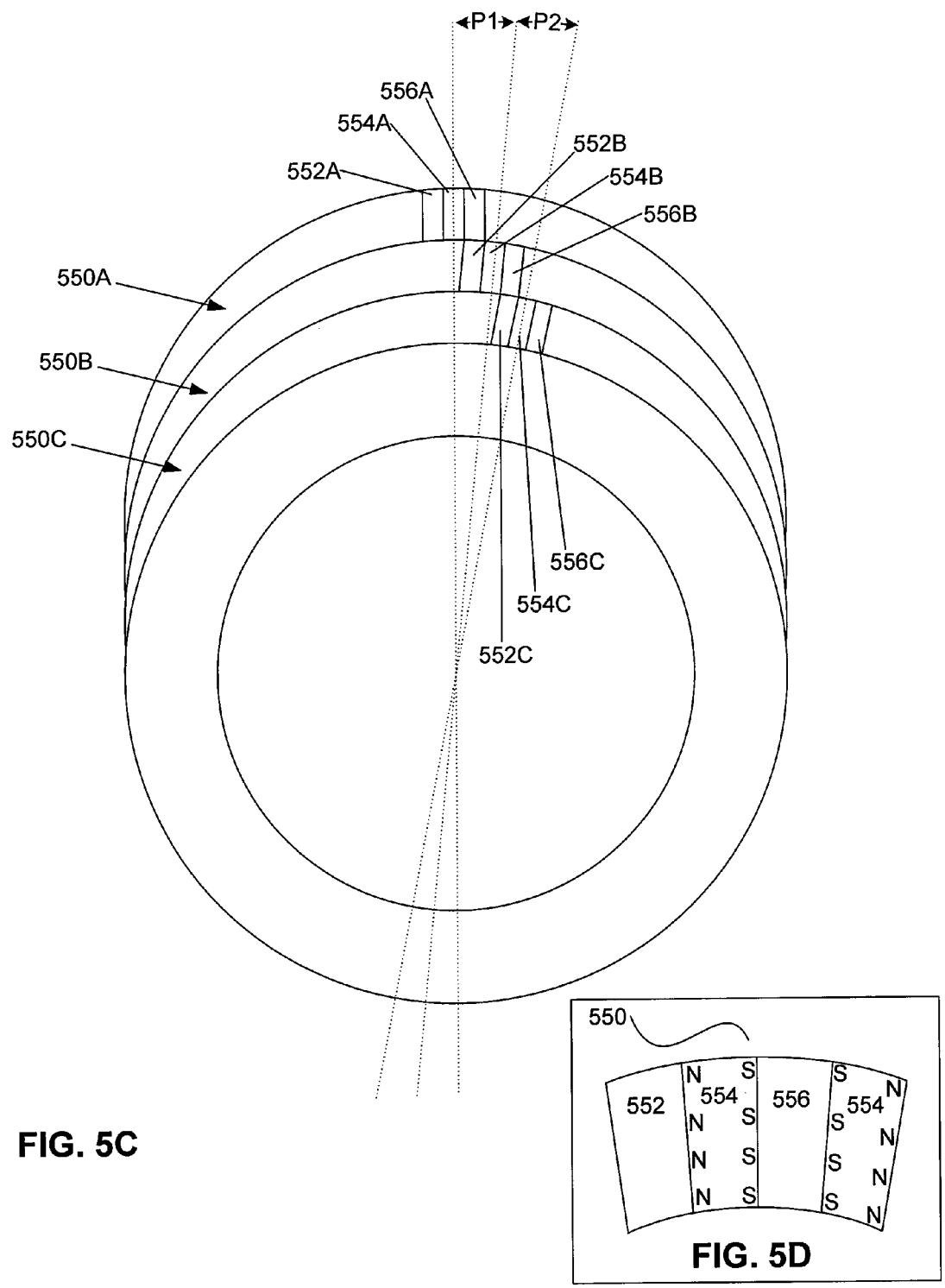
FIG. 5C illustrates an exemplary three-phase rotor configuration in accordance with an exemplary embodiment.
FIG. 5D illustrates, in close-up view, exemplary magnetic and flux concentrating portions of a rotor illustrated in FIG. 5C in accordance with an exemplary embodiment.

With reference now to FIG. 5C, in various exemplary embodiments, rotor portions 550A, 550B, and 550C of FIG. 5B are configured with a phase lag among rotor portions 510A, 510B and 510C. Magnet portions 554A, 554B and 554C are located on each of rotor portions 550A, 550B, and 550C, respectively. Moreover, multiple magnet portions 554A, 554B and 554C are located on each of rotor portions 550A, 550B, and 550C. For example, each rotor portion may comprise a pattern of alternating magnets and flux concentrating portions. With reference to FIG. 5D, for example, rotor 550 comprises a pattern of alternating magnets 554 and flux concentrating portions 552 and 556. This pattern may be repeated about the circumference of a rotor portion 550 so as to at least partially form the shape of a rotor portion 550.

In an exemplary embodiment, each of the magnet portions 554 on each of the rotors 550 is located between two flux conducting portions. For example, a particular magnet 554 is located between flux conducting portion 552 and 556. In general, magnets 554 may be arranged such that magnet surfaces having a common polarity engage a common flux concentrating portion (see, e.g., FIG. 5D). Moreover, in various exemplary embodiments a magnet portion 554 may be located adjacent additional and/or fewer flux conducting portions, as desired.

With reference again to FIG. 5C, in various exemplary embodiments rotor portions 550A, 550B, and 550C are partially rotated with respect to one another. In this manner, a phase lag p is defined between rotor portions 550A and 550B. Similarly, a phase lag p2 is defined between rotor portions 550B and 550C. Moreover, additional rotors 550 may be utilized to create additional phase lags, as desired.

Rotor portions 550A, 550B and 550C may be fixed relative to one another. In this manner, phase lags p1 and p2 are maintained as rotor portions 550A, 550B and 550C turn while in operation. Phase lags p1 and p2 cause each of rotor portions 550A, 550B, and 550C to produce a different phase of output. Moreover, rotor portions 550A, 550B, and 550C may also be movable with respect to one another in order to vary one or more phase lags.

As will be appreciated by one skilled in the art, phase lags p1 and p2 illustrated in FIG. 5C are merely representative. Numerous other phase lags and/or combinations of the same may be created in accordance with principles of the present disclosure. All such phase lags and/or resulting device input and/or output characteristics are considered to be within the scope of the present disclosure.

In an exemplary embodiment, polyphase device 500B may be operated as an electrical output device. In these configurations, each of rotor portions 550A, 550B, and 550C generates an alternating electrical output (for example, a substantially sinusoidal output) in corresponding coils 520A, 520B, and 520C. The electrical output of each coil 520A, 520B, and 520C has a phase that is shifted by a phase lag relative to each of the other coils 520A, 520B, and 520C (alternatively, advanced relative to each of the other coils 520A, 520B, and 520C). In general, the number of phase lags in polyphase device 500B may be up to one less than the number of rotor portions. For example, three rotor portions 550A, 550B, and 550C may be configured to create two phase lags. Three rotor portions 550A, 550B, and 550C may also be configured to create one phase lag (for example, if rotor portions 550B and 550C are aligned similarly with respect to rotor portion 550A). Three rotor portions 550A, 550B, and 550C may also be configured to create no phase lag when all three rotor portions 550A, 550B, and 550C are aligned similarly to one another. In general, any suitable number of phase lags, and any suitable magnitude of phase lags, may each be utilized, as desired.

For example, in various exemplary embodiments, in polyphase device 500B, the magnitude of each phase lag may be adjusted by adjusting the relative rotational alignment of each of the rotor portions 550. Polyphase device 500B may be operated as an electrical output device. In these configurations, phase outputs may be shifted evenly relative to each other within each period of the alternating output. For example, in a three-phase arrangement, the phases can be shifted relative to each other by one-third of the period. Alternatively, the phases can be shifted unevenly with respect to one another. For example, a second phase may be shifted 30 degrees with respect to a first phase. A third phase may be shifted by 60 degrees with respect to the second phase (and consequently, shifted by 90 degrees with respect to the first phase). Additional phases may similarly be shifted by any suitable value, as desired.

In various exemplary embodiments, in polyphase device 500B each phase output is produced by a different rotor portion 550A, 550B, and 550C and corresponding stator 510A, 510B, and 510C and coil 520A, 520B, and 520C. In other exemplary embodiments, polyphase device 500B is configured with a single stator portion 510 divided into separate phases sharing one or more rotors. In these exemplary embodiments, the number of components of the polyphase device may be reduced. For example, the polyphase device may produce and/or utilize more input/output phases than the number of rotors comprising the polyphase device. Further, in these exemplary embodiments the size the polyphase device may be reduced, for example by reducing a thickness of the polyphase device in at least a direction parallel to the axis of rotation of a rotor.

Figure 6A:
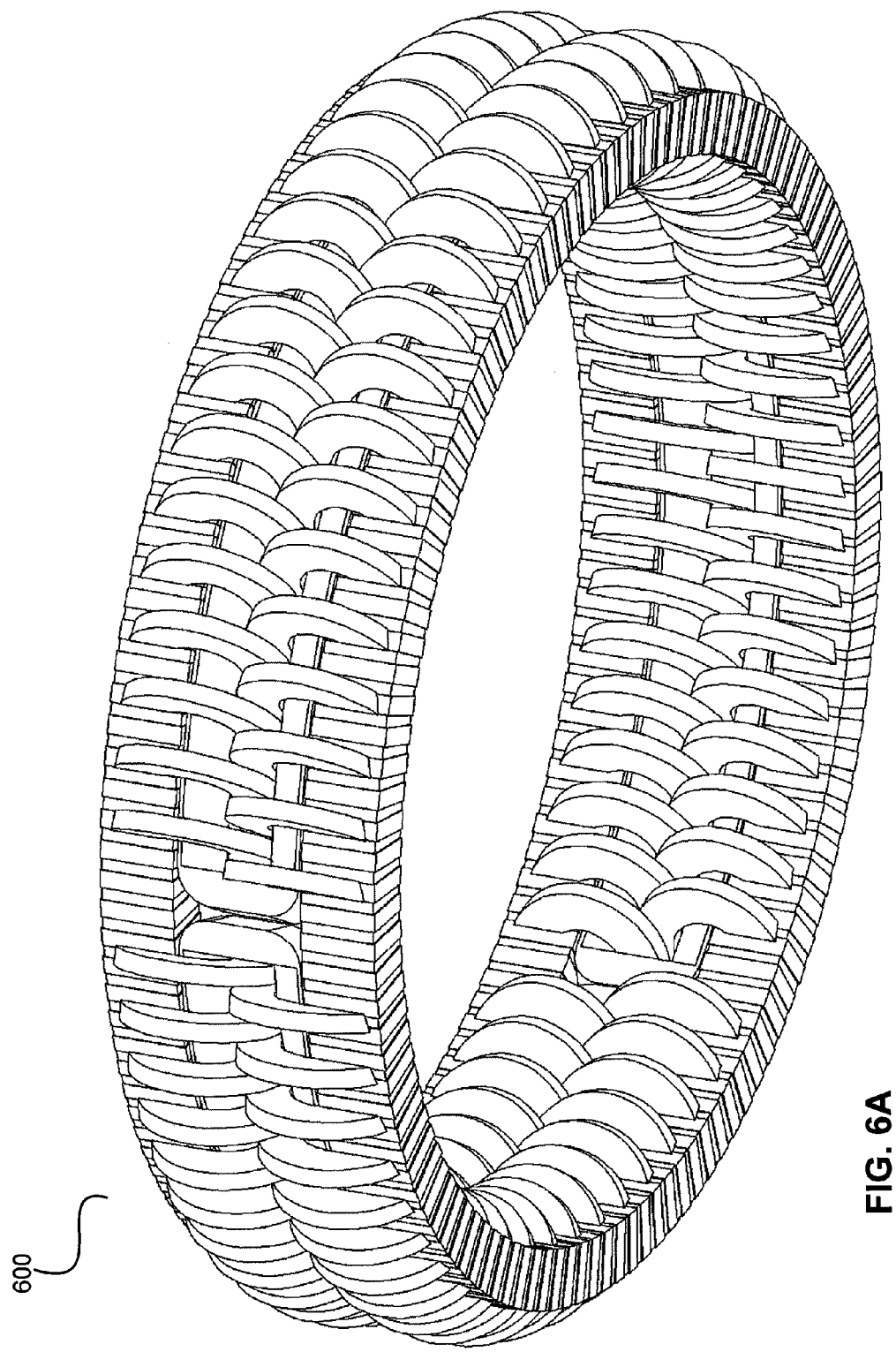
FIG. 6A illustrates an exemplary polyphase device having an interior stator in accordance with an exemplary embodiment.
Figure 6B:
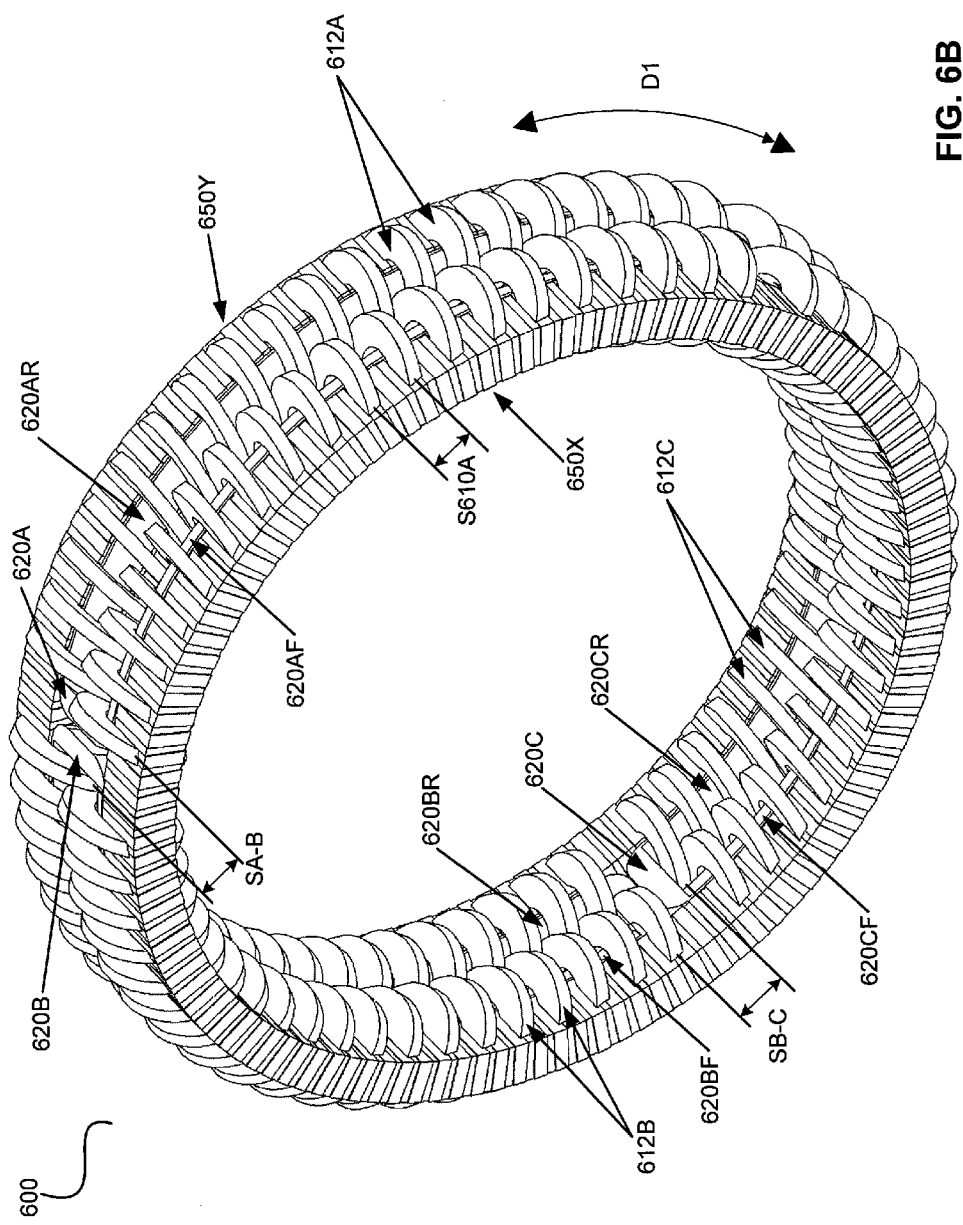
FIG. 6B illustrates an exemplary polyphase device having an interior stator in accordance with an exemplary embodiment.

For example, with reference now to FIGS. 6A and 6B, a polyphase device 600 may be configured with one or more interior stators. As used herein, an "interior stator" refers to a stator having a portion thereof and/or various components thereof disposed substantially between two or more rotors. In various exemplary embodiments, polyphase device 600 comprises three stators each comprising a plurality of flux conducting portions 612 (shown as 612A, 612B, and 612C). Polyphase device 600 further comprises three coils 620A, 620B, 620C, and two rotors 650X, 650Y. Flux conducting portions 612A, 612B, and 612C, and coils 620A, 620B, and 620C are located substantially between rotors 650X and 650Y.

Coils 620A, 620B, and 620C may each correspond to a different output phase. In various exemplary embodiments, spacing between flux conducting portions 612 within stators 610 is configured to create one or more phase relationships, as discussed below. In addition, polyphase device 600 may comprise any suitable number of coils 620, for example two coils 620, four coils 620, ten coils 620, and/or the like. Accordingly, polyphase device 600 may be configured with a number of output phases up to the number of coils 620 and corresponding phase portions of one or more stators and/or rotors. Additionally, multiple coils 620 may be configured to correspond to a similar phase.

Coils 620A, 620B, and 620C can comprise any suitable material configured to conduct electrical current responsive to a changing magnetic field, for example copper wire windings. In various exemplary embodiments, one or more coils 620 are wound from flat wire (i.e., wire having a rectangular cross section, as opposed to a circular cross section). Moreover, any of the coils, output windings, electrical connectors, and/or the like contemplated by this disclosure and/or in related disclosures, as suitable, can be fabricated from flat wire. Flat wire in a coil 620 allows more efficient filling of available space with conductive material. In this manner, a higher packing density of wire in the coil may be achieved. Efficiency gains from the increased packing density can outweigh potential disadvantages, for example the resulting increased weight of a particular coil. Moreover, any suitable material and/or shape of wire and/or coil may be used.

In various exemplary embodiments, with continued reference to FIG. 6B, each of the coils 620A, 620B, and 620C of polyphase device 600 comprises a loop with a forward portion, 620AF, 620BF, 620CF, and a rear portion, 620AR, 620BR, 620CR, respectively. Each of the forward and rear portions of coils 620A, 620B, and 620C of the polyphase device 600 is substantially surrounded by flux conducting portions 612 of corresponding stators such that magnetic flux can be conducted around coils 620A, 620B, and 620C.

In various exemplary embodiments, coils 620A, 620B, and 620C extend along a portion of a circumference of a circle. Coils 620A, 620B, and 620C may extend any suitable portion of a circumference of a circle, for example approximately one-third of the circumference. Coils 620A, 620B, and 620C may extend along portions having similar length. Moreover, coils 620A, 620B, and 620C may extend along portions having dissimilar lengths, as desired.

Moreover, forward portion 620AF may define a first arc, for example a semicircular arc, and rear portion 620AR may define a second arc, for example a semicircular arc. The first and second arcs may have a common radius from a common axis, for example a rotational axis of a transverse flux and/or commutated flux machine. Moreover, the first and second arcs (and/or forward portion 620AF and rear portion 620AR) may traverse a similar angular portion of a transverse flux machine. For example, in an exemplary three-phase embodiment, approximately 0° to 120° of the transverse flux machine is associated with a first coil (i.e. with a first and second portion of the first coil), approximately 120° to 240° of the transverse flux machine is associated with a second coil and its respective first and second portions, and approximately 240° to 360° of the transverse flux machine is associated with a third coil and its respective first and second portions. Moreover, the first and second arcs, (and/or forward portion 620AF and rear portion 620AR) may traverse overlapping angular portions of a transverse flux machine. For example, forward portion 620AF may traverse approximately 0° to 120° of the transverse flux machine, and rear portion may traverse approximately 5° to 115° of the transverse flux machine; thus, the angular portions are entirely overlapping. Additionally, the first and second arcs, (and/or forward portion 620AF and rear portion 620AR) may traverse partially overlapping angular portions of a transverse flux machine. For example, forward portion 620AF may traverse approximately 0° to 120° of the transverse flux machine, and rear portion 620AR may traverse approximately 5° to 125° of the transverse flux machine; thus, the angular portions are partially overlapping.

Conduction of flux through the flux conducting portions 612 about each of coils 620A, 620B, and 620C is able to produce an electrical output in each of coils 620A, 620B, and 620C. In various exemplary embodiments, flux is conducted through flux conducting portions 612A such that flux conducting portions 612A substantially surrounding forward portion 620AF are in phase with flux conducting portions 612A substantially surrounding rear portion 620AF. In this manner, forward portion 620AF and rear portion 620AR are in phase. Similar phase arrangements may be found in portions 620BF and 620CF, and 620BR and 620CR, respectively. In other exemplary embodiments, a forward portion may be out of phase with a corresponding rear portion.

Moreover, in various exemplary embodiments, a coil, for example coil 620A, may be oriented about a rotational axis of polyphase device 600 such that current in forward portion 620AF flows in a direction of rotation simultaneously with current in rear portion 620AR flowing opposite the direction of rotation. Stated another way, in various embodiments, current within coil 620A may be considered to flow around a somewhat "racetrack"-shaped loop extending only a portion of the angular distance around the rotational axis.

As will be readily appreciated, coils 620B and/or 620C may be shaped, sized, aligned, configured and/or may otherwise function and/or behave in a manner similar to coil 620A and portions thereof as described above.

In various exemplary embodiments, with continued reference to FIG. 6B, the flux conducting portions of polyphase device 600 can be C-shaped. Alternatively, the flux conducting portions can have one of a number of other shapes, for example U-shapes, rectilinear shapes, ovular shapes and linear shapes, in either cross-section or perspective, as desired. These flux conducting portions may be formed in any suitable manner. For example, the flux conducting portions can be fashioned from tape-wound torroid material, material including metallic glasses, laminated steel, powdered metal, or combinations of a number of these or other suitable flux conducting materials.

In an exemplary embodiment, with continued reference to FIG. 6B, the intra-coil flux conductor spacings S610A, S610B, and S610C (S610B and S610C not shown) (i.e., the spacings between adjacent flux conducting portions 612A, 612B, and 612C, respectively) are approximately uniform size. In addition, the spacing between adjacent flux conducting portions with respect to the forward portions 620AF, 620BF, and 620CF and rear portions 620AR, 620BR, and 620CR, of each of the coils are generally about the same size. However, the intra-coil flux conductor spacings S610A, S610B, and S610C on either and/or both the forward portions 620AF, 620BF, and 620CF and rear portions 620AR, 620BR, and 620CR of each of the coils can be other than approximately equal. For example, these flux conductor spacings may be varied in order to create different frequency outputs, or for other suitable purposes.

In contrast, with reference again to FIG. 6B, the inter-coil flux conductor spacings SA-B, SB-C, and SC-A (SC-A not shown) (i.e., the on-center spacings between adjacent flux conducting portions on adjacent coils 620A, 620B, and 620C), however, are generally unequal in size. In various exemplary embodiments, the inter-coil flux conductor spacings vary in order to set a particular phase relationship among the phases of the electrical output generated in each of coils 620A, 620B, and 620C. These phase relationships among coils and their association with various components of the rotors will be discussed in more detail below. However, in certain cases, it may be advantageous to have one or more of the inter-core flux conductor spacings SA-B, SB-C, and SC-A be approximately equal to another.

Figure 6C:
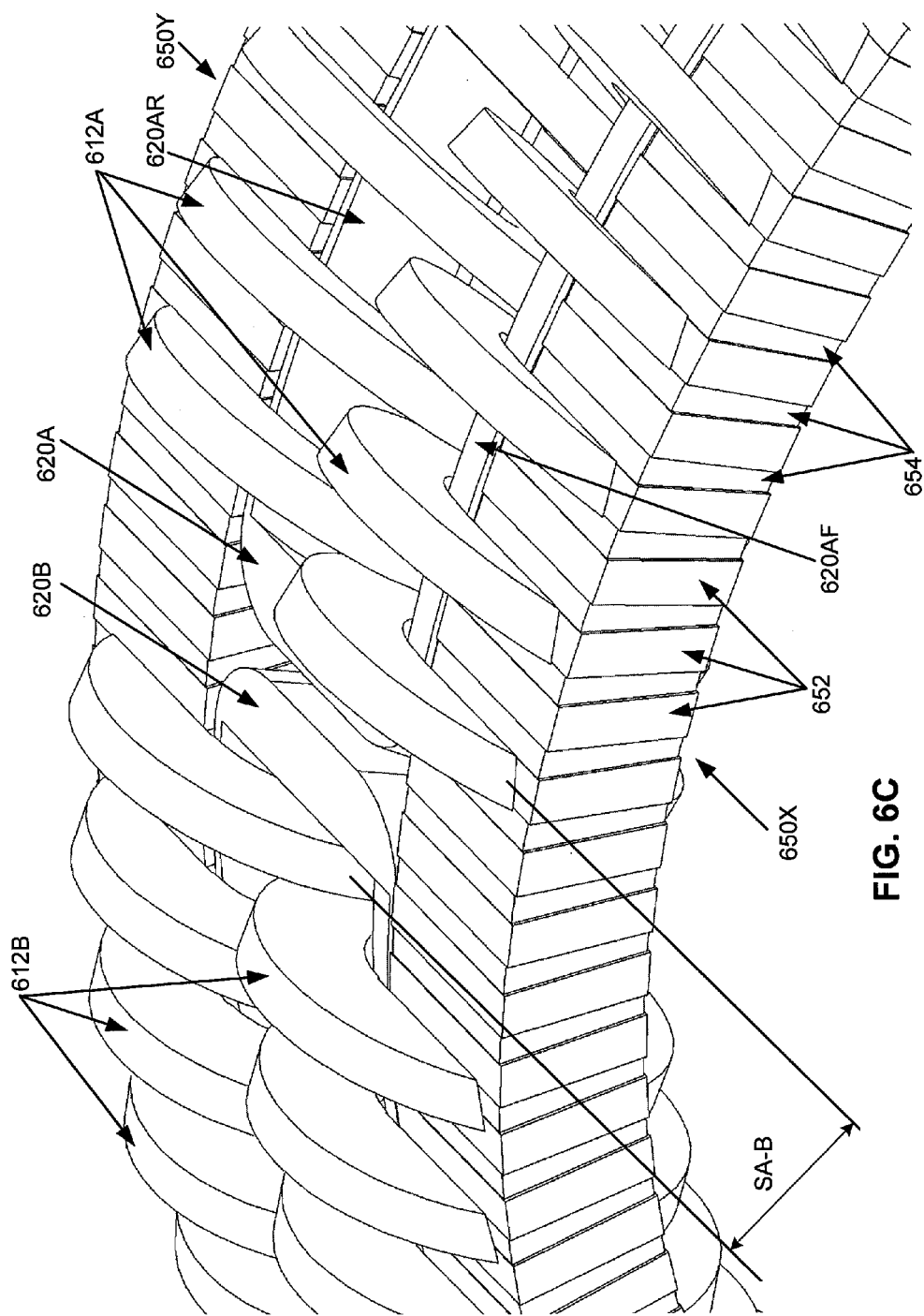
FIG. 6C illustrates, in close-up view, a portion of the polyphase device of FIGS. 6A and 6B, wherein the inter-core flux conductor spacing has been configured to create a 90° phase lag in accordance with an exemplary embodiment.

With reference now to FIG. 6C, a close-up view of a polyphase device 600 is illustrated. In an exemplary embodiment, the two rotor portions 650X, 650Y in polyphase device 600 are at least partially received within flux conducting portions 612 comprising stators 610. Rotor portions 650X, 650Y may be very similar and/or identical. Additionally, rotor portions 650X, 650Y may have a similar construction to rotors used in single phase devices. In various exemplary embodiments, rotor portions 650X, 650Y are generally aligned with one another.

Alternatively, rotor portions 650X, 650Y can have substantial differences. For example, rotor portions 650X, 650Y may be at least partially rotated relative to one another. Stated another way, rotor portions 650X, 650Y may be unaligned. Rotor portions 650X, 650Y may also have different sized alternating magnet portions 654 and/or flux concentrators 652.

In various exemplary embodiments, alternating magnet portions 654 and flux concentrators 652 are similar in features and functions to the corresponding regions 554 and 552/556, respectively, of rotor 550 as illustrated in FIG. 5D.

Moreover, in these embodiments rotor portions 650X, 650Y may be substantially similar to the rotors 550 used in polyphase device 500B. For example, like the magnet portions 554 of a rotor 550 illustrated in FIG. 5D, adjacent magnet portions 654 of rotor portion 650X may generally have alternating polar orientations. Similarly, adjacent magnet portions 654 of rotor portion 650Y may generally have alternating polar orientations. In other exemplary embodiments, however, alternate versions of rotor portion 650X may be utilized, for example wherein the poles of adjacent magnet portions 654 within rotor 650X are aligned rather than alternating. Similar alternate versions of rotor portion 650Y may be utilized. Moreover, all such combinations of alternating and/or aligned magnets are considered to be within the scope of the present disclosure.

In various exemplary embodiments, polyphase device 600 may be operated to generate electrical output from mechanical input. In other exemplary embodiments, polyphase device 600 may be operated in a substantially reverse manner, wherein electrical input is supplied to one or more coils in order to create mechanical output and/or other output (for example, turning of one or more rotors and/or mechanical components attached thereto). It will be appreciated by one of ordinary skill in the art that various principles may be applied to either and/or both of these configurations, as suitable.

In an exemplary embodiment, in order to generate electrical output from mechanical input, rotor portions 650X, 650Y spin relative to flux conducting portions 612A along the direction D1 shown in FIG. 6B. This causes magnet portions 654 and flux concentrators 652 of rotor portions 650X, 650Y to alternately align with flux conducting portions 612A. In this manner, flux is conducted along the flux conducting portions 612A.

In an exemplary embodiment, orientation of successive magnet poles of each of magnet portions 654 is such that each flux conducting portion 652 is at least partially surrounded by the same polarity of an abutting pair of magnet portions 654. This orientation creates a flux path from a first flux concentrator 652, through a flux conductor 612A, to a second flux concentrator 652 different from the first flux concentrator 652. In polyphase device 600 these flux paths encircle sections of coils 620A surrounded by flux conducting portions 612A. Rotating rotor portions 650X, 650Y successively moves flux concentrators 652 having opposing polarities near the flux conducting portions 612A. Thereby, rotating rotor portions 650X, 650Y substantially reverses the direction of the flux path with each sequential passing of flux concentrators 652 and flux conducting portions 612A relative to one another. This process creates alternating electrical output in coils 620A. Similar behavior and results may be simultaneously obtained in each of flux conducting portions 612B and 612C, and coils 620B and 620C.

In various exemplary embodiments, inter-coil flux conductor spacings SA-B, SB-C, and SC-A are different than intra-coil flux conductor spacings S610A, S610B, and S610C. In these embodiments, magnet portions 654 and flux concentrators 652 of rotors 650X, 650Y are aligned with flux conducting portions 612 of different stator sections 610 at different times. As a result, maximum flux conductance along a flux conducting portion 612A occurs at a different time than for a flux conducting portion 612B, and so on. The timing is governed by inter-coil flux conductor spacings SA-B, SB-C, and SC-A. In this manner, inter-core flux conductor spacings SA-B, SB-C, and SC-A may create a phase lag in the electrical output generated in a particular coil 620, for example coil 620A, with respect to the electrical output generated in one or more of the other coils 620, for example coil 620B.

In an exemplary embodiment, with continued reference to FIG. 6C, inter-core flux conductor spacing SA-B is configured to create a 90° phase lag between the outputs of coils 620A and 620B. As illustrated, the inter-core flux conductor spacing SA-B is such that flux conducting portions 612A surrounding coil 620A are aligned with the flux concentrators 654 of rotor portions 650X, 650Y. At the same time, flux conducting portions 612B surrounding coil 620B are aligned with magnet portions 654 of rotor portions 650X, 650Y. In this position, coils 620A and 620B are about 90° out of phase with one another. Consequently, when there is maximum flux conductance in flux conducting portions 612A around coil 620A, minimum flux conductance occurs in flux conducting portions 612B around coil 620B, and vice versa. As can be appreciated, the reverse is also true. In this manner, an approximately 90° phase lag may be created between the electrical outputs generated in coils 620A and 620B by turning rotors 650X, 650Y.

FIG. 6C illustrates an inter-coil flux conductor spacing creating a 90° phase lag between adjacent coils. However, in various exemplary embodiments, any suitable phase relationship between adjacent coils may be obtained by adjusting the inter-coil flux conductor spacing. For example, a 180° phase lag between the output of adjacent coils 620A and 620B can be created. This can be achieved by adjusting inter-coil flux conductor spacing SA-B. Adjusting SA-B can cause flux conducting portions 612A surrounding coil 620A to align with flux concentrators 652 having a first polarity at a given time T. Adjusting SA-B can also cause flux conducting portions 612B surrounding a coil 620B to align, at about the same time T, with flux concentrators 652 having an opposite polarity. Such an orientation result in, at any given time, flux being conducted around adjacent coils 620A and 620B in opposing directions (e.g., flux is conducted in a generally clockwise direction around coil 620A, while at the same time flux is conducted in a generally counter-clockwise direction around coil 620B).

Similarly, adjusting SA-B can cause flux conducting portions 612A surrounding coil 620A to align with flux concentrators 652 having a first polarity at a given time T. Adjusting SA-B can also cause flux conducting portions 612B surrounding a coil 620B to align, at about the same time T, with flux concentrators 652 having the same polarity. In these configurations, coils 620A and 620B are substantially in phase. Moreover, in various exemplary embodiments, any suitable phase relationship between coils 620, for example coils 620A and 620B, may be achieved by configuring an inter-coil flux conductor spacing, for example SA-B.

Although exemplary relationships are shown and discussed for a phase lag between coils 620A and 620B, similar approaches apply to phase relationships between any coils within polyphase device 600. Stated another way, in various exemplary embodiments phase relationships between coils 620A, 620B, and 620C can be adjusted, varied, and/or otherwise modified and/or controlled by similarly adjusting one or more of inter-coil flux conductor spacings SA-B, SB-C, and/or SC-A as discussed above. Further, these inter-coil flux conductor spacings can be adjusted independently of one another. In this manner, any suitable number of phase relationships between coils 620A, 620B, and/or 620C of polyphase device 600 may be created.

Moreover, although FIGS. 6A-6C illustrate a polyphase device 600 wherein phase relationships are fixed once the stator is constructed, in other exemplary embodiment polyphase devices may be configured with adjustable phase relationships between adjacent coils. For example, flux conducting portions 612A may be moveable with respect to flux conducting portions 612B. All such polyphase devices having adjustable phase relationships are considered to be within the scope of the present disclosure.

In various exemplary embodiments, with reference again to FIGS. 6B and 6C, flux conducting portions 612 associated with a particular coil 620 may be interleaved and/or otherwise placed and/or arranged in an alternating manner. For example, one flux conducting portion 612A partially encloses forward portion 620AF. Moving along direction D1, the next flux conducting portion 612A partially encloses rear portion 620AR. Continuing along direction D1, the next flux conducting portion 612A partially encloses forward portion 620AF, and so on in an alternating fashion. In this manner, flux conducting portions 612A may be placed more compactly and/or tightly. In various exemplary embodiments, flux conducting portions 612A may be arranged in an interleaved "back to back" configuration. In these arrangements, the "backs" of flux conducting portions 612A may extend at least partially past one another, for example as illustrated in FIG. 6C. In this manner, polyphase device 600 may be made more compact than if flux conducting portions 612A did not extend at least partially past one another. However, flux conducting portions 612A may also be arranged in an alternating "back to back" configuration where portions of adjacent flux conducting portions 612A do not extend past one another.

Similarly to the configurations discussed for flux conducting portions 612A above, flux conducting portions 612B, 612C, and/or other flux conducting portions of polyphase device 600 may be interleaved, interspersed, and/or otherwise alternated in a similar manner.

Figure 7A:
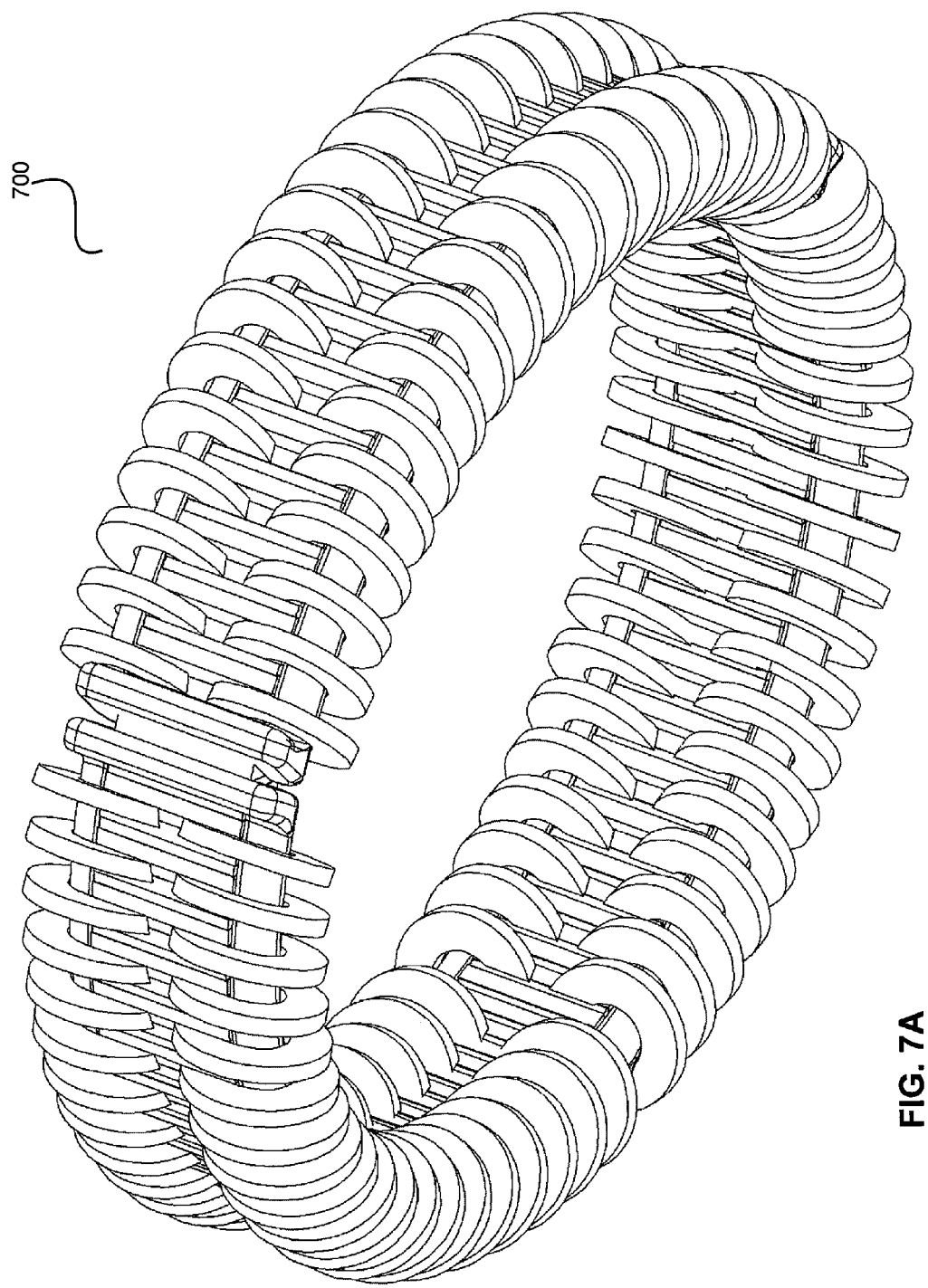
FIG. 7A illustrates an exemplary polyphase device having an interior rotor in accordance with an exemplary embodiment.
Figure 7B:
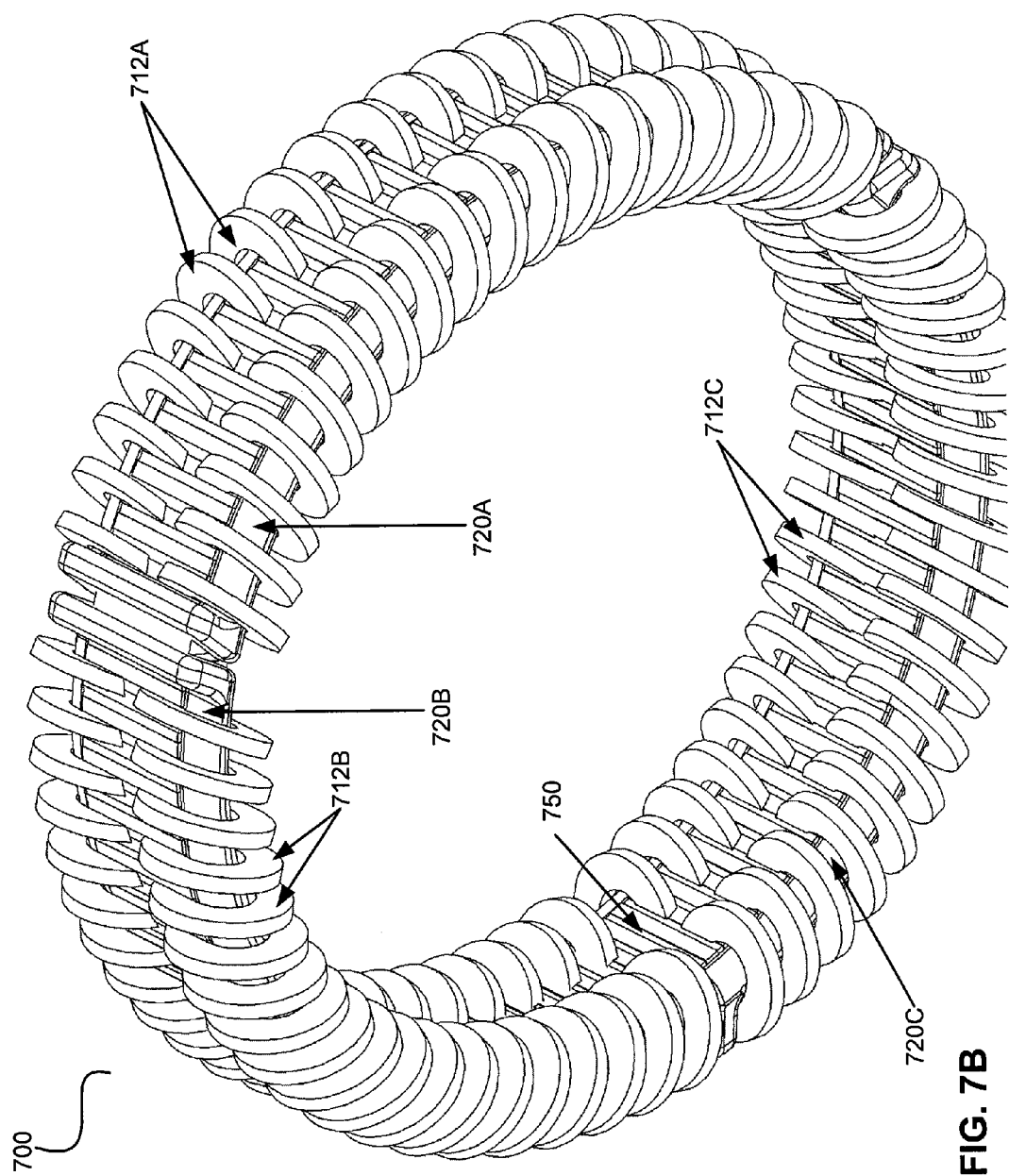
FIG. 7B illustrates an exemplary polyphase device having an interior rotor in accordance with an exemplary embodiment.

In addition to polyphase devices having an interior stator, principles of the present disclosure contemplate polyphase devices having an interior rotor. As used herein, an "interior rotor" refers to a rotor having a portion thereof and/or various components thereof disposed substantially between two or more stators. For example, in an exemplary embodiment, and with reference now to FIGS. 7A-7C, a polyphase device 700 is configured with an interior rotor 750. Polyphase device 700 further comprises three stators each comprising a plurality of flux conducting portions 712 (shown as 712A, 712B, and 712C). Polyphase device 700 further comprises three coils 720A, 720B, and 720C, located substantially within and/or surrounded by flux conducting portions 712A, 712B, and 712C, respectively. Rotor 750 is also located substantially within and/or surrounded by flux conducting portions 712A, 712B and 712C.

In various exemplary embodiments, the arrangement of flux conducting portions 712A, 712B, and 712C within polyphase device 700 is substantially the inverse of the arrangement of flux conducting portions 612A, 612B, and 612C within polyphase device 600 (see, e.g., FIGS. 6A-6C), in the sense that orientation of each of flux conducting portions 712A, 712B, and 712C is reversed when compared to the orientation of flux conducting portions 612A, 612B, and 612C. In this manner, polyphase device 700 is configured to operate with a single rotor 750.

Polyphase device 700 may comprise multiple coils 720, for example coils 720A, 720B, and 720C. Coils 720A, 720B, and 720C may correspond to one or more output phases. In an exemplary embodiment, each coil 720A, 720B, and 720C corresponds to a different output phase. Any suitable number of coils 720 may be utilized. For example, three coils 720A, 720B, and 720C may be utilized, corresponding to three phase portions of polyphase device 700. Alternatively, two, four or more coils 720 may be used and, correspondingly, two, four or more stators. As can be appreciated, the number of phases within polyphase device 700 may range between one phase to a number of phases equal to the number of coils 720 present in polyphase device 700. In various exemplary embodiments, the spacing among flux conducting portions 712A, 712B, and 712C associated with coils 720A, 720B, and 720C, respectively, may be altered to create one or more phase relationships between them.

In various exemplary embodiments, functional relationships between various components of polyphase device 700, for example between coils 720A, 720B, and 720C and flux conducting portions 712A, 712B, and 712C, are substantially similar to relationships found in polyphase device 600. Additionally, sizes, shapes, geometries, and/or other characteristics of components of polyphase device 700 may be similar to those found in polyphase device 600. Moreover, the intra-coil spacing and inter-coil spacing of polyphase device 700 may similarly be varied to achieve multiple phases and/or phase relationships as disclosed hereinabove.

Figure 7C:
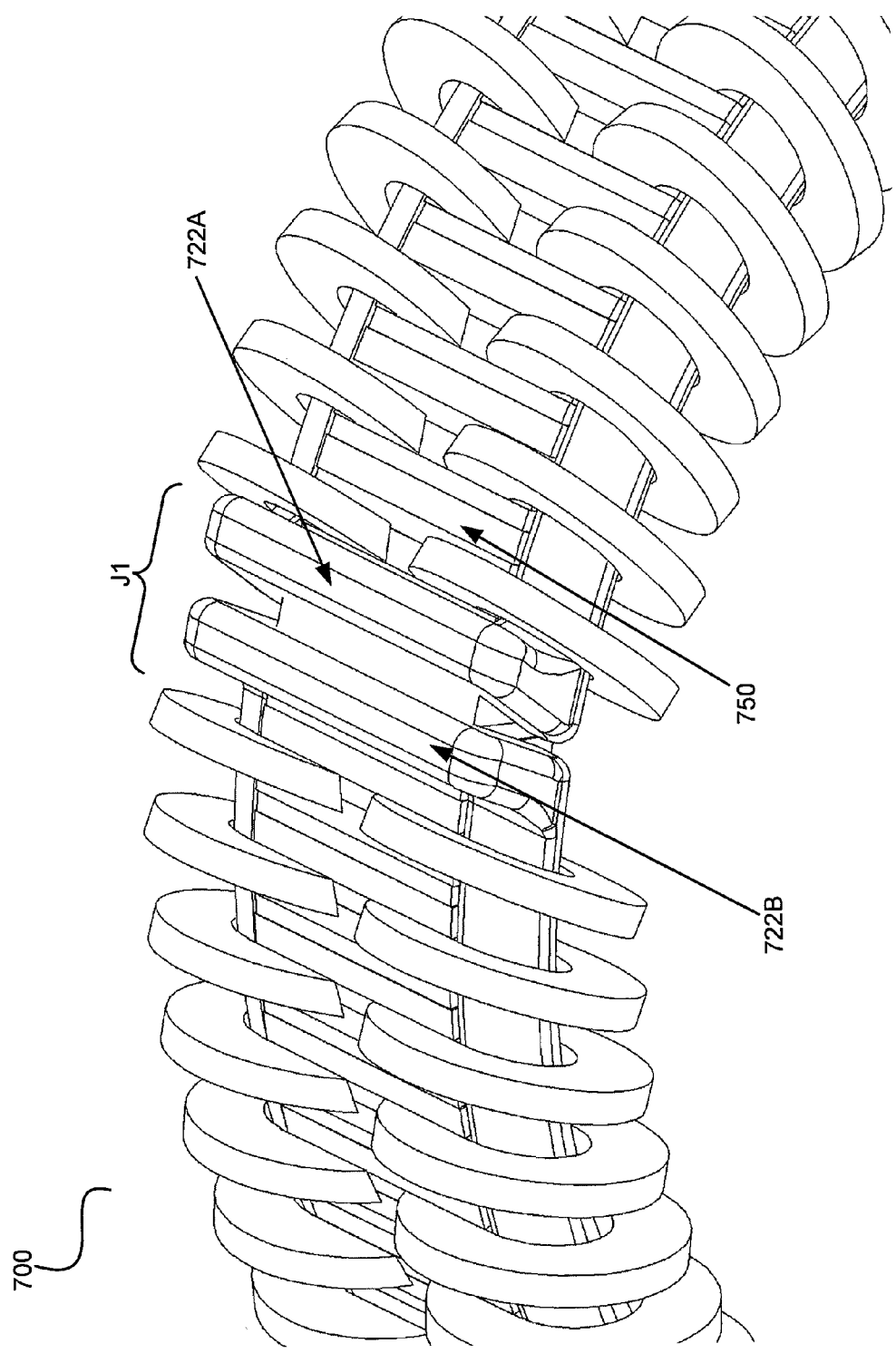
FIG. 7C illustrates, in close-up view, a portion of the polyphase device of FIGS. 7A and 7B in accordance with an exemplary embodiment.

In contrast to the configuration of polyphase device 600, with further reference to FIG. 7C, in various exemplary embodiments each of coils 720A, 720B, and 720C of polyphase device 700 are configured with a "bridging" segment 722A, 722B, and 722C (722C not shown), respectively, at a junction between adjacent coils. In these embodiments, coil 720A further comprises bridging segment 722A. Similarly, coil 720B further comprises bridging segment 722B, and coil 720C further comprises bridging segment 722C. Bridging segments 722A and 722B are located at junction J1 between coils 720A and 720B. Bridging sections may be utilized in order to complete loops in coils, for example without occupying space desired for mechanical operation of rotor 750. Bridging sections may be placed over and/or under a rotor, as desired. In this manner, a rotor may be rotated without contacting a bridging segment.

Moreover, a bridging segment may be placed through magnets and/or flux concentrators, as desired. In various exemplary embodiments, a coil may be coupled to a group of magnets and flux concentrators, and bridging segments may pass therethrough. Flux switches at least partially enclosing the coil may then be rotated to generate output in the coil.

In various exemplary embodiments, polyphase device 700 may be operated in a manner at least partially similar to polyphase device 600. For example, polyphase device 700 may be operated to generated electrical output by providing a mechanical input to rotor 750. Polyphase device 700 may also be operated to generate mechanical output at rotor 750 responsive to electrical input in one or more coils 720. Moreover, polyphase device 700 may be configured with fixed phase relationships, for example by fixing flux conducting portions 712A, 712B, and 712C with respect to one another. Alternatively, polyphase device 700 may be configured with variable phase relationships, for example by allowing flux conducting portions 712A, 712B, and 712C to move relative to one another, as disclosed hereinabove.

In addition to polyphase devices having an interior rotor, principles of the present disclosure contemplate polyphase devices having "slim" designs. As used herein, "slim" refer generally to configurations that reduce a dimension of a polyphase device, for example configurations wherein coil paths are substantially orthogonal to the axis A of the polyphase device, configurations wherein multiple rotors share a common rotational plane, and/or the like.

Figure 8A:
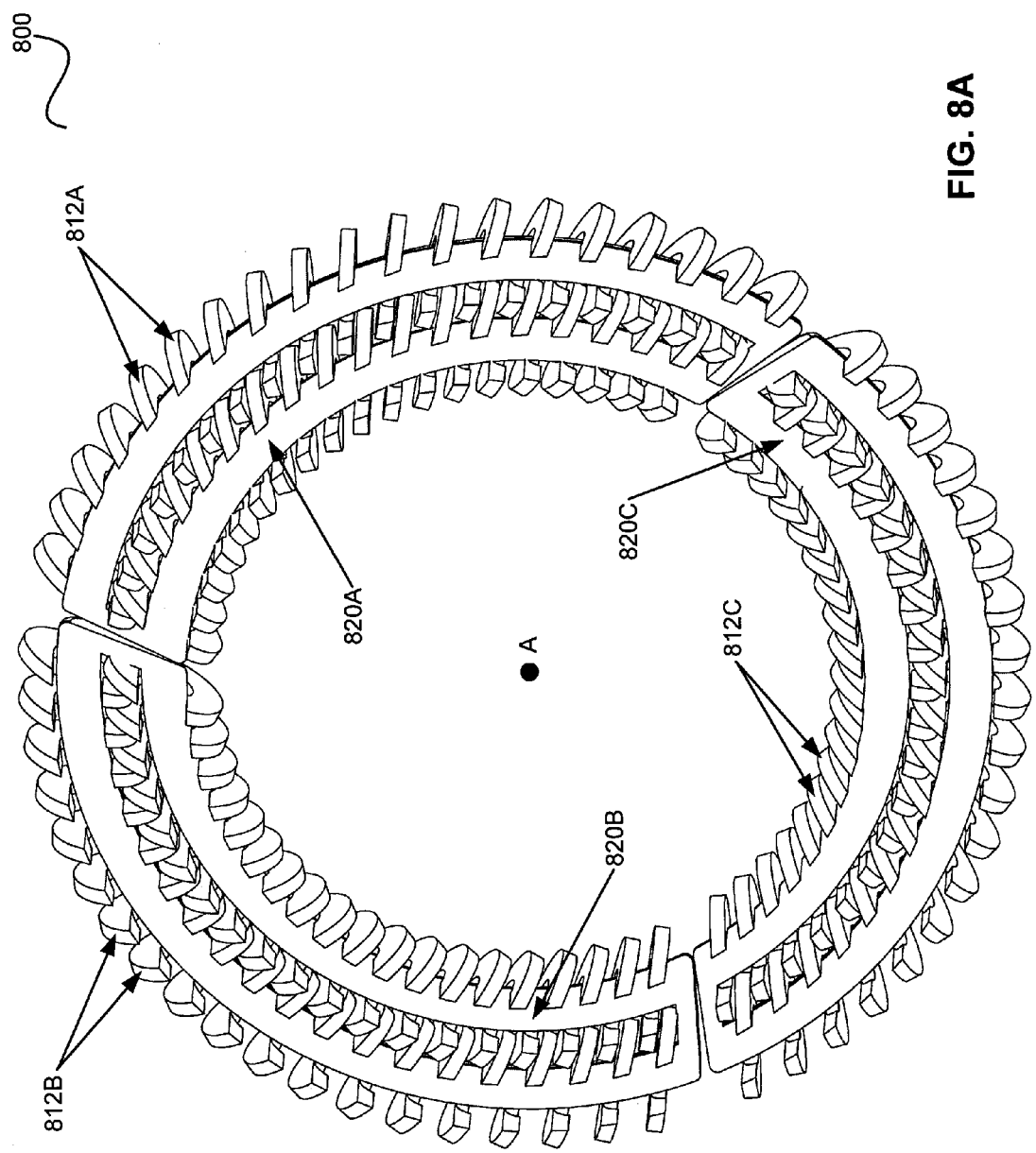
FIG. 8A illustrates, in a perspective view, an exemplary polyphase device having a slim design in accordance with an exemplary embodiment.

For example, in an exemplary embodiment and with reference now to FIG. 8A, a polyphase device 800 is configured with a slim design. Polyphase device 800 comprises three stators each comprising a plurality of flux conducting portions 812 (shown as 812A, 812B, and 812C). Polyphase device 800 further comprises three coils 820A, 820B, and 820C. The paths defined by coils 820A, 820B, and 820C are generally orthogonal with the axis A of rotation of polyphase device 800 (shown coming out of the page as viewed in FIG. 8A). Polyphase device 800 further comprises one or more rotor portions 850 (not shown).

In an exemplary embodiment, coils 820A, 820B, and 820C correspond to three phases based on intra-coil flux conductor spacing and inter-coil flux conductor spacing as previously discussed. In other exemplary embodiments, coils 820A, 820B, and 820C correspond to two phases and/or one phase. Moreover, because the plane defined by coils 820A, 820B, 820C is substantially orthogonal to the axis A of polyphase device 800, polyphase device 800 may accordingly be formed to have a reduced or "slimmer" length along axis A. For example, polyphase device 800 may be formed to have a slimmer length along axis A than another design wherein a coil path is not orthogonal to axis A, but is rather substantially parallel to and/or at least partially traverses a distance parallel to axis A. Moreover, polyphase device 800 may slimmer than other designs having multiple rotors located at different points along axis A. Stated another way, in an exemplary embodiment, a first portion of a coil is in the same rotational plane as a second portion of that coil. In general, polyphase device 800 may be sized, shaped, and/or otherwise configured for use in various applications where a particular length along a rotational axis is desirable.

Figure 8B:
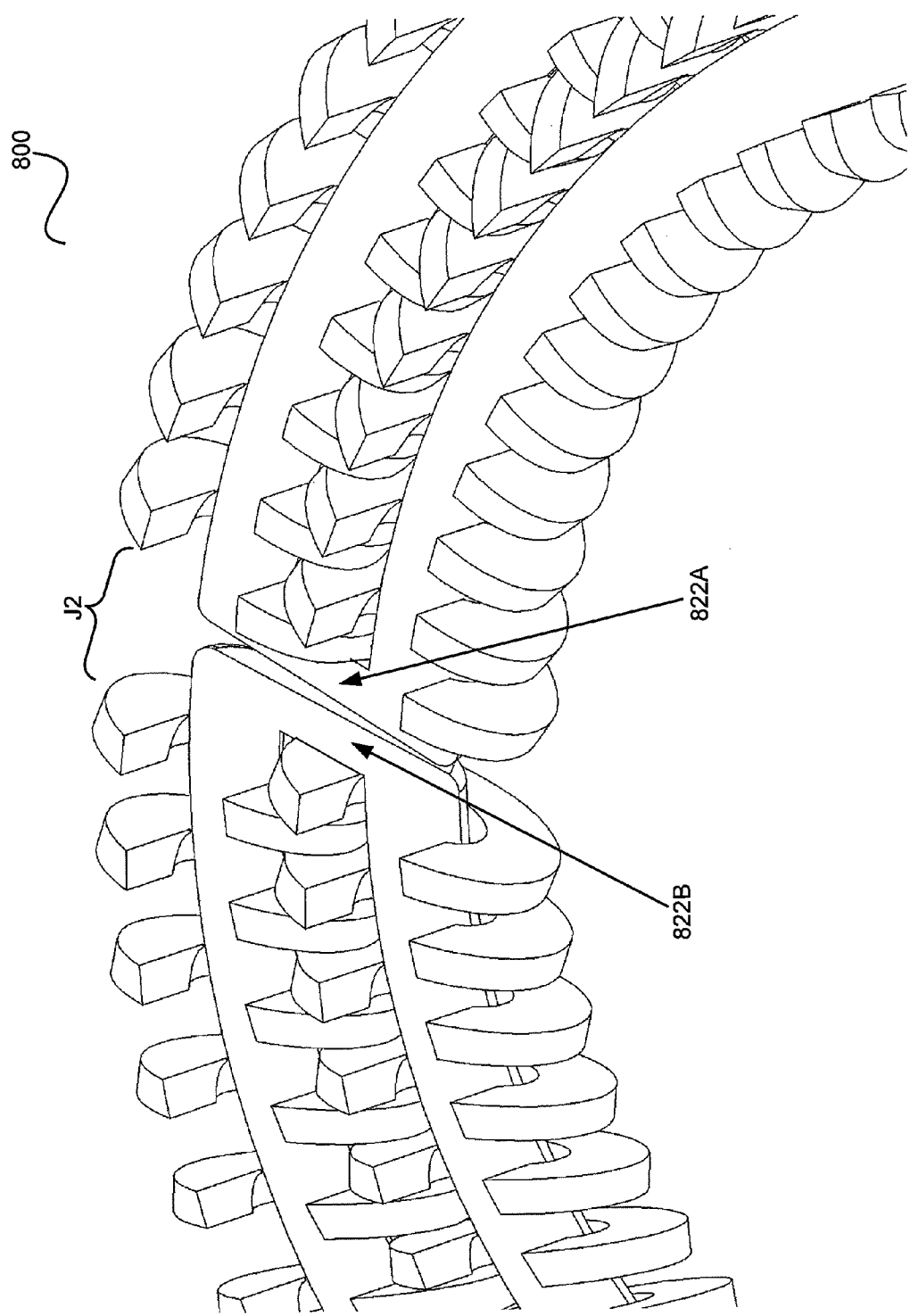
FIG. 8B illustrates, in close-up view, a portion of the polyphase device of FIG. 8A in accordance with an exemplary embodiment.
Figure 8C:
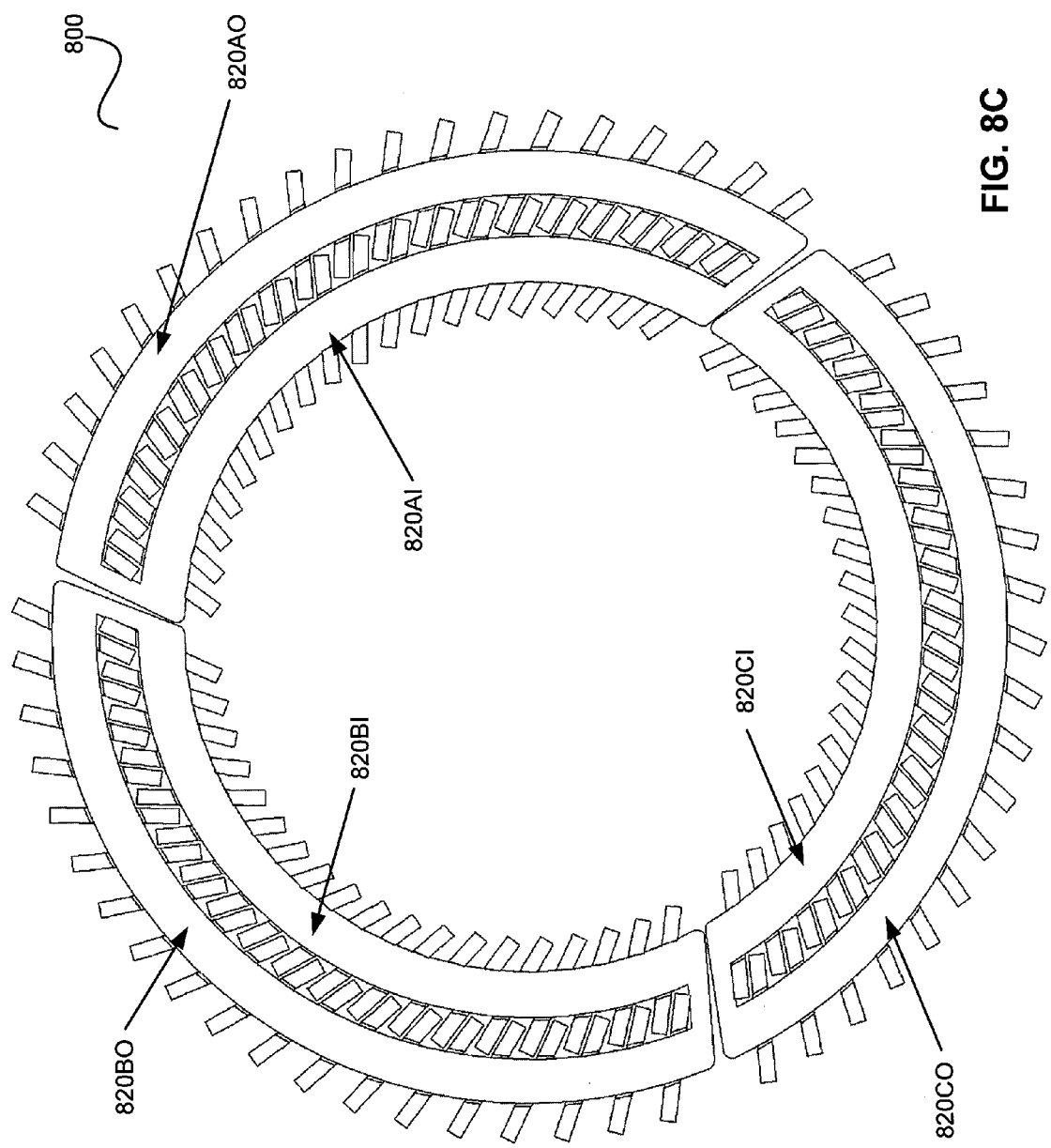
FIG. 8C illustrates, in a face-on view, the exemplary polyphase device of FIGS. 8A and 8B in accordance with an exemplary embodiment.

In various exemplary embodiments, with continued reference to FIG. 8C, each of the coils 820A, 820B, and 820C of polyphase device 800 comprises a loop with an inner portion, 820AI, 820BI, 820CI, and a outer portion, 820AO, 820BO, 820CO, respectively.

Moreover, outer portion 820AO may define a first arc, for example a first semicircular arc. Inner portion 820AI may define a second arc, for example a second semicircular arc. The first and second arcs are concentric about a common axis, for example a rotational axis of a transverse flux machine and/or commutated flux machine. The first and second arcs may also be co-planar.

In various exemplary embodiments, outer portions 820AO, 820B0, and 820CO extend along a portion of a circumference of a circle. Outer portions 820AO, 820BO, and 820CO may extend any suitable portion of a circumference of a circle, for example approximately one-third of the circumference. Outer portions 820AO, 820BO, and 820CO may extend along portions having similar length. Moreover, outer portions 820AO, 820BO, and 820CO may extend along portions having dissimilar lengths, as desired. Inner portions 820AI, 820BI, and 820CI may traverse angular distances approximately corresponding to angular distances traversed by outer portions 820AO, 820BO, and 820CO, respectively, for example identical angular distances. Alternatively, inner portions 820AI, 820BI, and 820CI may traverse different angular distances.

In various exemplary embodiments, functional relationships between various components of polyphase device 800, for example between coils 820A, 820B, and 820C and flux conducting portions 812A, 812B, and 812C, are substantially similar to relationships found in polyphase device 600. Additionally, sizes, shapes, geometries, and/or other characteristics of components of polyphase device 800 may be similar to those found in polyphase device 600. Moreover, an intra-coil flux conductor spacing and/or inter-coil flux conductor spacing of polyphase device 800 may similarly be varied to achieve multiple phases and/or phase relationships as disclosed hereinabove.

In various exemplary embodiments, polyphase device 800 may be operated in a manner at least partially similar to polyphase device 600. For example, polyphase device 800 may be operated to generated electrical output by providing a mechanical input to a rotor. Polyphase device 800 may also be operated to generate mechanical output at a rotor responsive to electrical input in one or more coils 820. Moreover, polyphase device 800 may be configured with fixed phase relationships, for example by fixing flux conducting portions 812A, 812B, and 812C with respect to one another. Alternatively, polyphase device 800 may be configured with variable phase relationships, for example by allowing flux conducting portions 812A, 812B, and 812C to move relative to one another, as disclosed hereinabove.

Further, in various exemplary embodiments, and with reference now to FIG. 8B, polyphase device 800 may be configured to reduce the amount of coil material at a junction between adjacent coils. In an exemplary embodiment, one or more bridging sections 822A, 822B, and 822C 822B complete coils 820A, 820B, and 820C, respectively. For example, bridging sections 822A and 822B complete coils 820A and 820B at junction J2. Bridging sections 822A, 822B, and 822C may be significantly thinner than corresponding bridging sections 722A, 722B, and 722C for polyphase device 700. For example, in an exemplary embodiment bridging sections 822A, 822B, and 822C are thinner in a "slim" configuration because bridging sections 822A, 822B, and 822C may not need to extend out of the plane of the main body of coils 820A, 820B, and 820C, respectively, for example in order to allow clearance for a rotor. In this manner, the amount of material utilized in coils 820A, 820B, and 820C may be desirably reduced. Because materials comprising coils 820A, 820B, and 820C are often heavy and/or expensive, and because materials comprising coils 820A, 820B, and 820C are prone to resistive heating and/or other losses, reducing the amount of material in coils 820A, 820B, and 820C may be advantageous. Moreover, because coil material comprising bridging sections 822A, 822B, and 822C is not at least partially surrounded by a corresponding flux conducting portion 812A, 812B, or 812C, this material is generally not generating useful output, but rather losses. Hence, this material may be considered to be somewhat similar to material in an "end turn" in a conventional motor, and as such may be suitably reduced and/or minimized, as desired.

In various exemplary embodiments, although no rotors are illustrated in FIGS. 8A and 8B, polyphase device 800 may accommodate a suitable number of rotors, for example two rotors, in order to allow interaction between the rotors and various portions of polyphase device 800. Moreover, polyphase device 800 may comprise any suitable number of rotors, as desired.

In addition to polyphase devices having slim designs, principles of the present disclosure contemplate polyphase devices wherein a first polyphase device is "nested" within another polyphase device, for example about a common axis. As used herein, a "nested" configuration refers to a single-phase and/or polyphase device surrounding another single-phase and/or polyphase device having a common axis. By utilizing a nesting configuration, the resulting combined polyphase device may be configured with an increased mechanical and/or electrical output potential for a particular device size.

For example, multiple nested polyphase devices may be connected to the same mechanical device, such as the drive shaft for a vehicle. In this way, in various exemplary embodiments a combined polyphase device can provide many times, for example three times, the output of an un-nested polyphase device, with essentially the same footprint. These configurations can be particularly advantageous for applications requiring a higher power output in a relatively compact and/or fixed space, for example motors for electric vehicles or other electric motors. Nested polyphase devices can also be used, for example, to derive a greater amount of electrical output from a similar amount of mechanical input. Such an approach enables more compact electrical generator designs, turbine designs, and/or designs for devices incorporating the same.

Moreover, although various exemplary nested devices discussed herein are polyphase devices, it will be appreciated by one skilled in the art that various single-phase devices, for example devices presented in various co-pending applications incorporated by reference herein, may be configured in a nested arrangement. Principles of the present disclosure may apply equally to such configurations, and all such applications, configurations, and/or nesting arrangements are considered to be within the scope of the present disclosure.

Figure 9A:
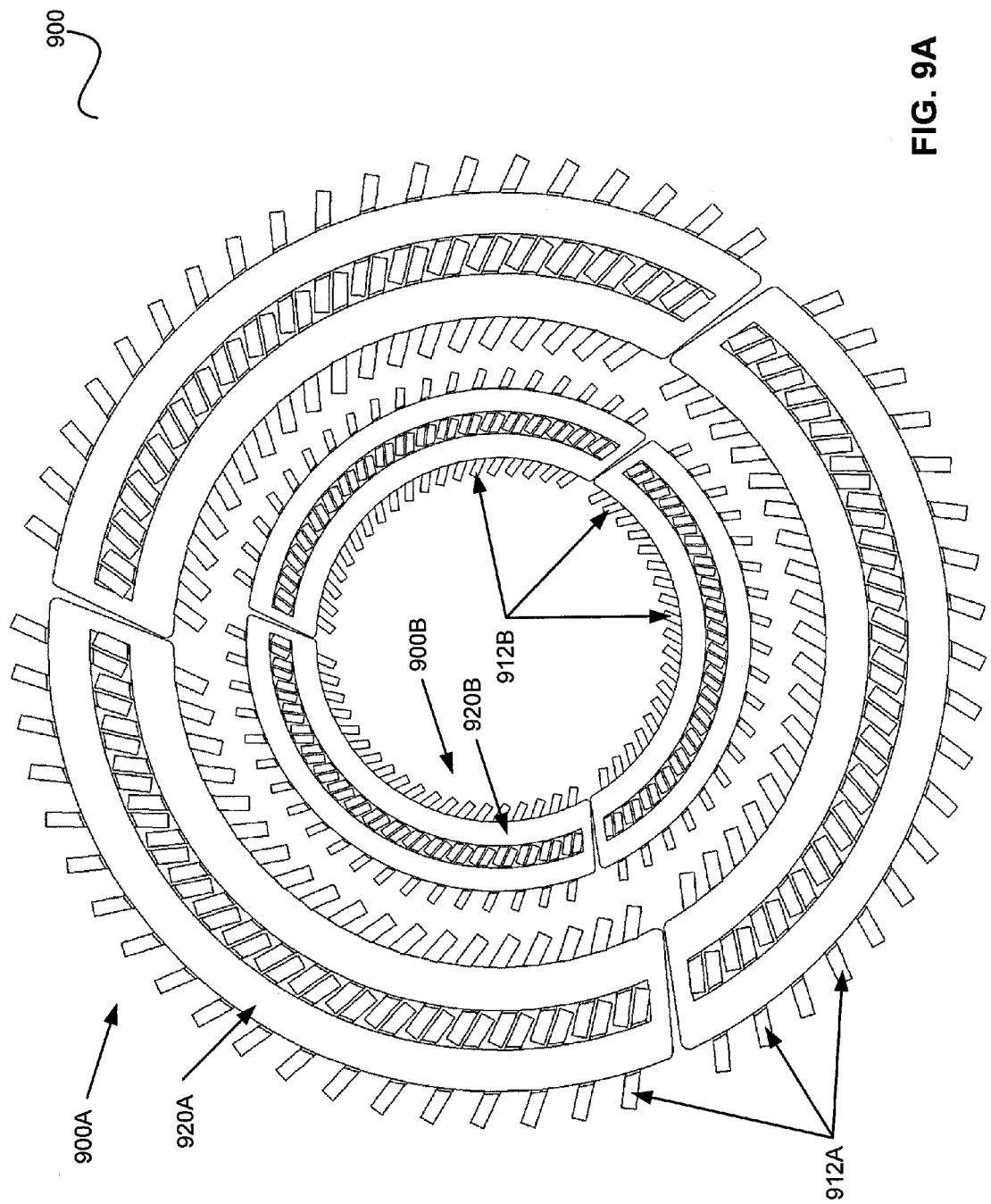
FIG. 9A illustrates a polyphase device of FIGS. 8A-8C having a similar polyphase device nested within in a phase-matched manner in accordance with an exemplary embodiment.
Figure 10:
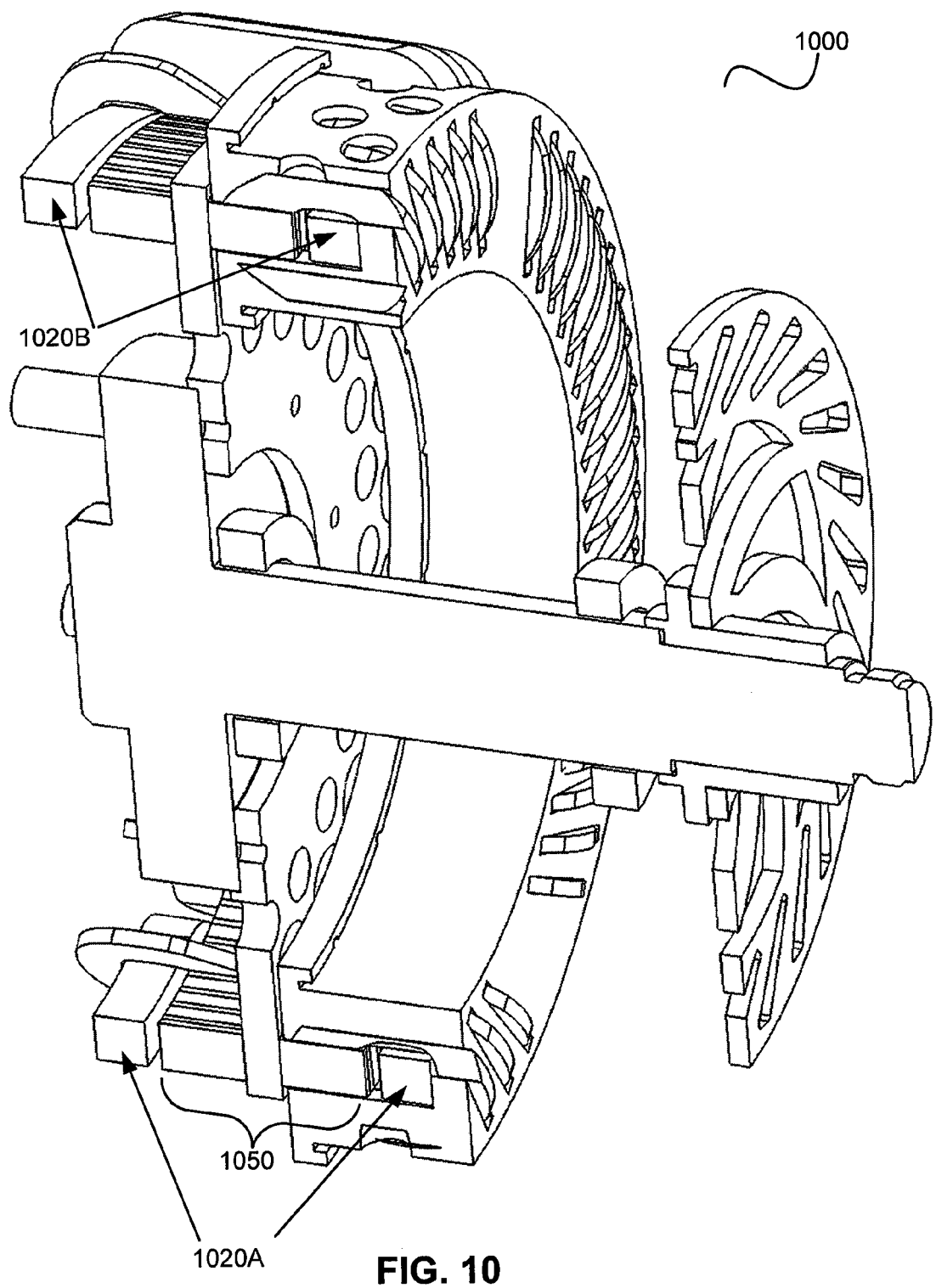
FIG. 10 illustrates, in cross-sectional view, an exemplary polyphase device configured for use in a vehicle in accordance with an exemplary embodiment.

Turning now to FIG. 9A, in an exemplary embodiment a nested polyphase device 900 comprises a first polyphase device 900A and a second polyphase device 900B. Second polyphase device 900B may be substantially similar to first polyphase device 900A. For example, second polyphase device 900B may be a scaled-down or smaller version of first polyphase device 900A. Alternatively, second polyphase device 900B may be configured with a design substantially different from first polyphase device 900A. Second polyphase device 900B is configured to be located at least partially within first polyphase device 900A.

In an exemplary embodiment, configuring second polyphase device 900B to be a scaled-down or smaller version of first polyphase device 900A is useful in order to preserve phase relationships between first polyphase device 900A and second polyphase device 900B. In other exemplary embodiments, phase relationships between first polyphase device 900A and second polyphase device 900B may be maintained, varied, and/or controlled by utilizing similarly sized components therein, but utilizing different stator component spacing, different rotor configurations, and/or the like.

In various exemplary embodiments, certain components of second polyphase device 900B and/or other components and/or features of polyphase device 900 are scaled down in size from similar components in first polyphase device 900A, for example by an approximately consistent scaling factor. For example, in an exemplary embodiment flux conducting portions 912B of second polyphase device 900B are approximately half the size of flux conducting portions 912A of first polyphase device 900A. Correspondingly, a spacing between adjacent flux conducting portions 912B on second polyphase device 900B may be approximately half that of a spacing between adjacent flux conducting portions 912A on first polyphase device 900A. Moreover, in order to maintain a desired phase relationship, a rotor utilized in second polyphase device 900B may be a scaled down version of a rotor utilized in first polyphase device 900A, for example a rotor scaled down by a similar factor. Thus, for example, magnet portions and flux concentrating portions of a rotor for second polyphase device 900B may be approximately half the size of magnet portions and flux concentrating portions of a rotor for first polyphase device 900A.

In various exemplary embodiments, a rotor for second polyphase device 900B is connected to the same mechanical input/output device as a rotor for first polyphase device 900A so as to operate in tandem. This arrangement can be advantageous, for example in applications with spatial restrictions. Moreover, these rotors may also be coupled to different mechanical devices, such that first polyphase device 900A and second polyphase device 900B may be utilized substantially independently.

Moreover, polyphase device 900 may comprise any suitable number of nested polyphase devices. In principle, an area comprising an interior section of a particular polyphase device may be substantially filled with one or more additional polyphase and/or single-phase devices in order to form polyphase device 900.

In various exemplary embodiments, a physical alignment may exist between like phase portions of a first polyphase device 900A and a second polyphase device 900B (see, e.g., FIG. 9A). In these embodiments, a coil 920A of first polyphase device 900A and a corresponding coil 920B of second polyphase device 900B are configured to correspond to approximately a same input/output phase. Moreover, corresponding coils (e.g., 920A and 920B) may be electrically connected so as to provide similar output or to receive a similar input. Alternatively, corresponding coils may be connected in other arrangements more suited for a particular implementation.

Additionally, polyphase device 900 may comprise a phase-staggered configuration. With reference now to FIG. 9B, in various exemplary embodiments polyphase device 900 comprises a first polyphase device 900A and a second, similar polyphase device 900B nested therein in a phase-staggered configuration. In these exemplary embodiments, similar phase portions of first polyphase device 900A and second polyphase device 900B, for example coils 920A and 920B, are staggered in order to increase a distance therebetween. In this manner, electrical interference between similar phase portions may be reduced. Moreover, interference between coils at junctions J2, J3 and J4 in first polyphase device 900A, and between coils at junctions J5, J6 and J7 in second polyphase device 900B may similarly be reduced. Additionally, phase staggering may reduce noise, vibration, and/or the like, for example by a mechanical pulse generated in one portion of the device corresponding to a similar mechanical pulse generated at approximately the same time on an opposite side.

In various exemplary embodiments, portions of first polyphase device 900A corresponding to approximately the same input/output phase as portions of second polyphase device 900B may be located on generally opposite sides of polyphase device 900. For example, in an exemplary embodiment, coils 920A and 920B correspond to approximately the same output phase. Coils 920A and 920B may be located approximately 180 rotational degrees away from one another about an axis of rotation of polyphase device 900. Stated another way, coils 920A and 920B may be located on generally opposite sides of polyphase device 900. In this manner, physical separation between corresponding phases may be maximized.

Moreover, various alternate configurations of any of the polyphase devices disclosed herein are within the scope of the present disclosure. For example, FIGS. 5A-5C illustrate axial gap configurations. Certain exemplary embodiments, including but not limited to those depicted therein, may alternatively be configured with radial gap configurations, as desired. In contrast, FIGS. 6A-6C, 7A-7C, 8A-8C, 9A-9B, and 10 illustrate radial gap configurations. Other exemplary embodiments, including but not limited to those depicted therein, may alternatively be configured with axial gap configurations, as desired.

Furthermore, FIGS. 5A-5B, 6A-6C, 7A-7C, 8A-8C, 9A-9B, and 10 illustrate cavity engaged configurations. Various exemplary embodiments, including but not limited to those depicted therein, may alternatively be configured with face engaged configurations, as desired. In contrast, FIG. 5C illustrates a face engaged configuration. Various other exemplary embodiments, including but not limited to those depicted therein, may also be configured with cavity engaged configurations, as desired.

Moreover, FIGS. 5A-10 illustrate transverse flux machine configurations. Various exemplary embodiments, including but not limited to those depicted therein, may alternatively be configured with commutated flux machine configurations.

For example, in various exemplary embodiments, a polyphase device may utilize a plurality of partial stators sharing a common rotor, for example a multipath rotor. In an exemplary embodiment, a polyphase device may comprise three partial stators sharing a common rotor, each partial stator corresponding to an input and/or output phase. Moreover, a polyphase device may comprise any suitable number of partial stators, as desired. Use of one or more partial stators may facilitate assembly and/or disassembly of a polyphase device.

Use of one or more partial stators may also facilitate scalable and/or modular polyphase devices, wherein partial stators may be added and/or removed, as desired. A partial stator may be added and/or removed in order to modify one or more properties of a polyphase device, for example a torque density, a power output, an input and/or output electrical waveform, and/or the like.

In various exemplary embodiments and in accordance with principles of the present disclosure, a polyphase device may be configured for use in a vehicle. For example, with momentary reference to FIG. 10, a polyphase device 1000 may be mounted on an axle of a wheel. In this manner, polyphase device 1000 may function as a direct drive hub motor.

In an exemplary embodiment, polyphase device 1000 may be similar to polyphase device 700 having an interior rotor. For example, polyphase device 1000 comprises at least two coils 1020A and 1020B, and a rotor 1050 disposed between portions of each of coils 1020A and 1020B. However, any suitable polyphase device may be utilized in a vehicle, and the exemplary embodiments presented herein are by way of illustration and not of limitation.

Principles of the present disclosure may suitably be combined with principles for stators in transverse flux machines and commutated flux machines, for example principles for partial stators and/or gapped stators, as disclosed in co-pending U.S. patent application Ser. No. 12/611,728 filed Nov. 3, 2009, now U.S. Pat. No. 7,851,965, entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and commutated flux machines, for example tape wound rotors and/or multipath rotors, as disclosed in co-pending U.S. patent application Ser. No. 12/611,733 filed Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Moreover, principles of the present disclosure may suitably be combined with any number of principles disclosed in any one of and/or all of the U.S. patent applications incorporated by reference herein. Thus, for example, a particular transverse flux machine and/or commutated flux machine may incorporate use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

STATEMENTS OF INVENTION

An electrical machine, comprising: a conductive coil comprising a first coil portion, a second coil portion, a first coil end, and a second coil end, wherein the first coil portion and the second coil portion are connected via the first coil end and the second coil end to form a loop, wherein a voltage is induced in more than 90% of the coil mass, and wherein the electrical machine is at least one of a transverse flux machine or a commutated flux machine.

An electrical machine, comprising: a first rotor having a first plane of rotation; a second rotor having a second plane of rotation parallel to and non-overlapping the first plane of rotation, wherein the first rotor and second rotor have a common rotational axis; and a stator at least partially enclosing a coil, wherein the stator is located substantially between the first rotor and the second rotor, wherein the stator engages the first rotor and the second rotor, and wherein the electrical machine is at least one of a transverse flux machine or a commutated flux machine.

An electrical machine, comprising: a conductive coil comprising a first coil portion, a second coil portion, a first coil end, and a second coil end, wherein the first coil portion and the second coil portion are connected via the first coil end and the second coil end to form a loop; a first set of flux conductors at least partially enclosing the first coil portion, wherein the first set of flux conductors engage a first rotor; and a second set of flux conductors at least partially enclosing the second coil portion, wherein the second set of flux conductors engage a second rotor, wherein the first set and the second set are arranged back-to-back, and wherein the electrical machine is at least one of a transverse flux machine or a commutated flux machine. The first set and the second set are arranged in an alternating manner.

An electrical machine, comprising: a conductive coil comprising a first coil portion, a second coil portion, a first coil end, and a second coil end, wherein the first coil portion and the second coil portion are connected via the first coil end and the second coil end to form a loop; and a rotor, wherein the first coil portion is located on a first side of the rotor, wherein the second coil portion is located on an opposite side of the rotor, wherein the first coil end and the second coil end extend from the first side of the rotor to the opposite side of the rotor to form the loop, and wherein the electrical machine is at least one of a transverse flux machine or a commutated flux machine. The first coil end may comprise a bridging segment traversing the rotor such that the rotor is between the bridging segment and an axis of rotation. The first coil end may comprise a bridging segment passing between the rotor and an axis of rotation. The electrical machine may be a polyphase machine. The electrical machine may further comprise a first set of flux conductors at least partially enclosing the first coil portion, wherein the first set of flux conductors engage a first side of the rotor, and a second set of flux conductors at least partially enclosing the second coil portion, wherein the second set of flux conductors engage a second side of the rotor different from the first side, and wherein the first side and the second side are separated by a rotational plane of the rotor.

An electrical machine, comprising: a rotor having a first side and a second side separated by a rotational plane of the rotor; a first set of flux conducting portions engaging the first side; a second set of flux conducting portions engaging the second side; and a coil at least partially enclosed by the first set of flux conducting portions and the second set of flux conducting portions, wherein the electrical machine is at least one of a transverse flux machine or a commutated flux machine.

A nested electrical machine, comprising: a first electrical machine and a second electrical machine having a common rotational axis, wherein the second electrical machine is disposed entirely within an inner radius of the first electrical machine, wherein the first electrical machine is at least one of a transverse flux machine or a commutated flux machine, and wherein the second electrical machine is at least one of a transverse flux machine or a commutated flux machine. The first electrical machine and the second electrical machine may differ in phase.

An electrical machine, comprising: a rotor; and a plurality of partial stators coupled to the rotor, wherein each partial stator of the plurality of partial stators corresponds to a different input/output phase, and wherein the electrical machine is at least one of a transverse flux machine or a commutated flux machine.

An electrical machine, comprising: a first rotor having a first radius; a second rotor having a second radius smaller than the first radius, the first rotor and the second rotor having a common rotational plane; a conductive coil comprising a first coil portion, a second coil portion, a first coil end, and a second coil end, wherein the first coil portion and the second coil portion are connected via the first coil end and the second coil end to form a loop; wherein the first coil portion is at least partially enclosed by a first set of flux conductors, wherein the second coil portion is at least partially enclosed by a second set of flux conductors, wherein the first set of flux conductors engage only the first rotor, and wherein the second set of flux conductors engage only the second rotor.

What is claimed is:

1. An electrical machine, comprising:
   a rotor having an inner side and an outer side with respect to a rotational axis of the electrical machine;
   a conductive coil comprising a first coil portion, a second coil portion, a first coil end, and a second coil end, wherein the first coil portion and the second coil portion are connected via the first coil end and the second coil end to form a loop, and wherein the conductive coil extends along only a portion of the circumference of the rotor;
   a first set of flux conductors at least partially enclosing the first coil portion; and
   a second set of flux conductors at least partially enclosing the second coil portion, wherein the electrical machine is at least one of a transverse flux machine or a commutated flux machine.

2. The electrical machine of claim 1, wherein the first set of flux conductors and the second set of flux conductors are engaged with the inner side of the rotor in a face engaged configuration.

3. The electrical machine of claim 1,
   wherein the first coil portion defines a first semicircular arc,
   wherein the second coil portion defines a second semicircular arc, and
   wherein the first arc and the second arc have a common radius from the rotational axis of the electrical machine.

4. The electrical machine of claim 1, wherein the first set of flux conductors are engaged with the inner side of the rotor and the outer side of the rotor, and wherein the second set of flux conductors are engaged with the inner side of the rotor and the outer side of the rotor.

5. The electrical machine of claim 4, wherein the first set of flux conductors and the second set of flux conductors are each cavity engaged with the rotor.

6. The electrical machine of claim 1, wherein the first set of flux conductors do not at least partially enclose the second coil portion.

7. The electrical machine of claim 1, further comprising a plurality of conductive coils.

8. The electrical machine of claim 7, wherein at least two of the plurality of conductive coils differ in phase.

9. The electrical machine of claim 1, wherein the electrical machine is configured as a direct drive hub motor for an automobile.

10. The electrical machine of claim 1, wherein the electrical machine is configured as a hub motor for a bicycle.

11. The electrical machine of claim 1, wherein the first set of flux conductors and the second set of flux conductors together engage over 90% of the length of the conductive coil.

12. The electrical machine of claim 1, wherein the conductive coil is oriented about the rotational axis such that current in the first coil portion flows in a direction of rotation of the rotor simultaneously with current in the second coil portion flowing opposite the direction of rotation of the rotor.

13. The electrical machine of claim 12, wherein the current in the first coil portion and the current in the second coil portion are induced responsive to rotation of the rotor.

14. The electrical machine of claim 1, wherein the electrical machine is configured with a continuous, thermally stable torque density in excess of 50 Newton-meters per kilogram.

15. The electrical machine of claim 1, wherein flux conductors of the first set of flux conductors and flux conductors of the second set of flux conductors are alternatingly located along a portion of the circumference of the rotor.

16. A method for generating electricity, the method comprising:
   providing an electrical machine comprising a conductive coil comprising a first coil portion, a second coil portion, a first coil end, and a second coil end, wherein the first coil portion and the second coil portion are connected via the first coil end and the second coil end to form a loop, and wherein the conductive coil extends less than 360 degrees around the rotational axis of an electrical machine;
   at least partially enclosing the first coil portion with a first set of flux conductors;
   at least partially enclosing the second coil portion with a second set of flux conductors;
   engaging a rotor with the first set of flux conductors and the second set of flux conductors; and
   rotating the rotor to induce a voltage in the conductive coil, wherein the electrical machine is at least one of a transverse flux machine or a commutated flux machine.

17. The method of claim 16, wherein the conductive coil is oriented about the rotational axis such that current in the first coil portion flows in a direction of rotation of the rotor simultaneously with current in the second coil portion flowing opposite the direction of rotation of the rotor.

18. The method of claim 16, wherein the first set of flux conductors and the second set of flux conductors are engaged with the inner side of the rotor in a face engaged configuration.

19. A method for generating electricity, the method comprising:
   coupling an electrical machine to a load, wherein the electrical machine comprises a rotor and a conductive coil, and wherein the electrical machine is at least one of a transverse flux machine or a commutated flux machine; and
   rotating the rotor to induce a voltage in the conductive coil, wherein the conductive coil comprises a first coil portion, a second coil portion, a first coil end, and a second coil end, wherein the first coil portion and the second coil portion are connected via the first coil end and the second coil end to form a loop, and
   wherein the conductive coil extends less than 360 degrees around the rotational axis of the electrical machine.

20. The method of claim 19, wherein the conductive coil is oriented about the rotational axis such that current in the first coil portion flows in a direction of rotation of the rotor simultaneously with current in the second coil portion flowing opposite the direction of rotation of the rotor.

* * * * *